(12) United States Patent
Suzuki

(10) Patent No.: US 11,827,296 B2
(45) Date of Patent: Nov. 28, 2023

(54) STEERING CONTROL DEVICE

(71) Applicant: DENSO CORPORATION, Kariya (JP)

(72) Inventor: Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 467 days.

(21) Appl. No.: 16/922,880

(22) Filed: Jul. 7, 2020

(65) Prior Publication Data

US 2021/0009198 A1    Jan. 14, 2021

(30) Foreign Application Priority Data

Jul. 9, 2019 (JP) ................... 2019-127630

(51) Int. Cl.
*B62D 5/04* (2006.01)
*B62D 5/00* (2006.01)
*H02K 11/27* (2016.01)
*H02P 21/22* (2016.01)
*B62D 6/00* (2006.01)

(52) U.S. Cl.
CPC ............. *B62D 6/002* (2013.01); *B62D 5/006* (2013.01); *B62D 5/0409* (2013.01); *B62D 5/0421* (2013.01); *B62D 5/0463* (2013.01); *B62D 6/008* (2013.01)

(58) Field of Classification Search
None
See application file for complete search history.

(56) References Cited

U.S. PATENT DOCUMENTS

| 2004/0200661 | A1 | 10/2004 | Sugitani et al. |
| 2004/0211618 | A1 | 10/2004 | Ogawa et al. |
| 2008/0164087 | A1 | 7/2008 | Koyama et al. |
| 2019/0256129 | A1* | 8/2019 | Oka ............ B62D 5/0463 |
| 2019/0367075 | A1* | 12/2019 | Kodera ............ B62D 6/008 |

FOREIGN PATENT DOCUMENTS

| JP | 2003-048561 A | 2/2003 |
| JP | 2005-096725 A | 4/2005 |
| JP | 2005-178613 A | 7/2005 |
| JP | 2008-087644 A | 4/2008 |
| JP | 6299087 B2 | 3/2018 |

* cited by examiner

*Primary Examiner* — Adam D Tissot
*Assistant Examiner* — Laura E Linhardt
(74) *Attorney, Agent, or Firm* — MASCHOFF BRENNAN

(57) ABSTRACT

A steering control device in a seer-by-wire system calculates a current limit presentation command value so as to convey an output-limited state of a turning device to a driver, calculates a steering torque command value on a basis of a physical quantity corresponding to an output torque of the turning device, and calculates a basic reaction force torque command value being a basic value of a reaction force torque command value so that a detection value of a torque sensor follows a target value that is based on the steering torque command value. The control device controls a current flowing to a reaction-force-use rotary electric machine on a basis of the basic reaction force torque command value and the end presentation command value, and increases an absolute value of the current limit presentation command value when the turning device is in the output-limited state.

19 Claims, 16 Drawing Sheets

STEERING CONTROL DEVICE

CROSS-REFERENCE TO RELATED APPLICATION

The present application is based on Japanese Patent Application No. 2019-127630 filed on Jul. 9, 2019, disclosure of which is incorporated herein by reference.

TECHNICAL FIELD

The present disclosure relates to a steering control device.

BACKGROUND

There is a technology regarding output limiting in a steering apparatus of a vehicle.

SUMMARY

The present disclosure provides a steering control device for use in a seer-by-wire system. In an aspect of the present disclosure, the steering control device calculates a current limit presentation command value so as to convey an output-limited state of a turning device of the steer-by-wire system to a driver, calculates a steering torque command value on a basis of a physical quantity corresponding to an output torque of the turning device, and calculates a basic reaction force torque command value being a basic value of a reaction force torque command value so that a detection value of a torque sensor of the steer-by-wire system follows a target value that is based on the steering torque command value. The steering control device controls a current flowing to a reaction-force-use rotary electric machine of the reaction force device, on a basis of the basic reaction force torque command value and the end presentation command value, and increases an absolute value of the current limit presentation command value when the turning device is in the output-limited state.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
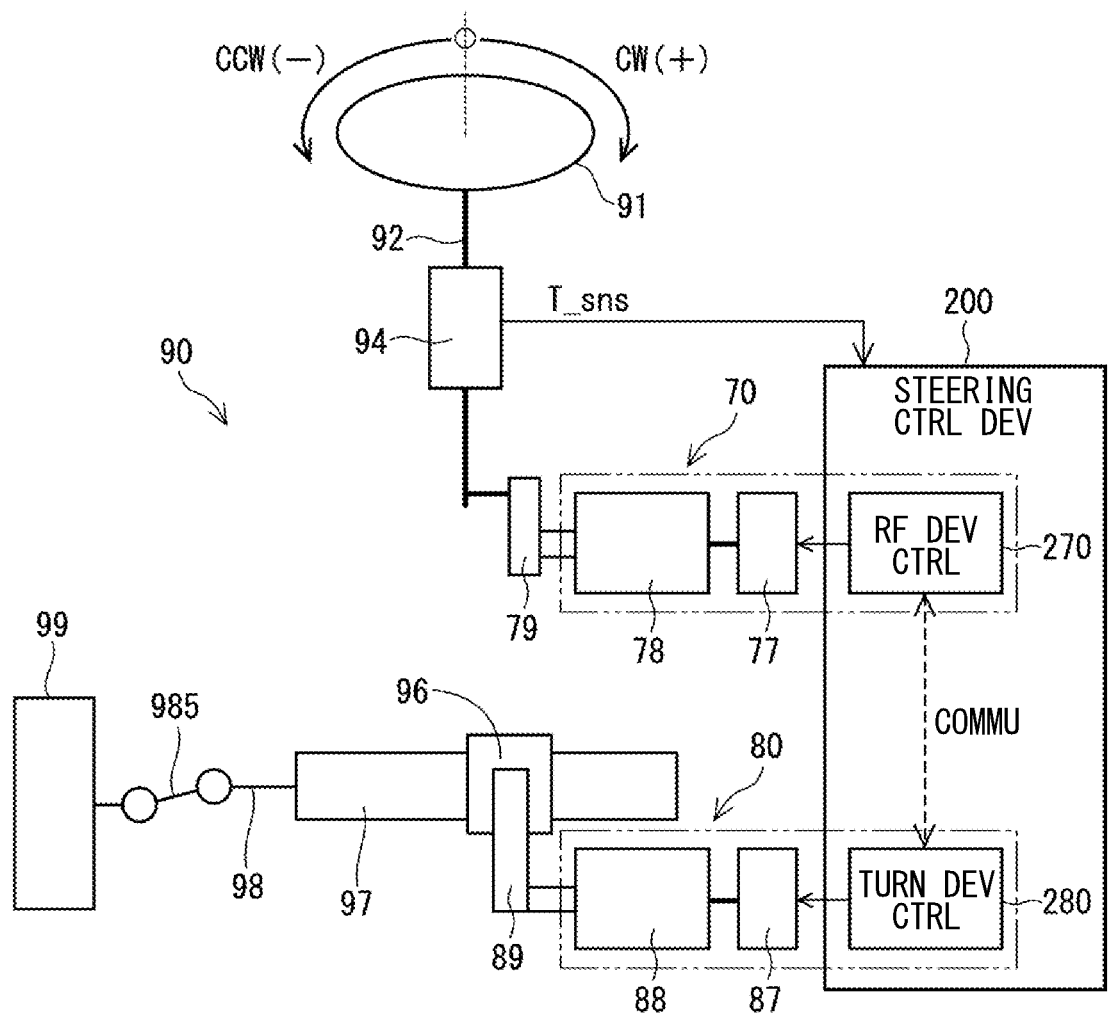
FIG. 1 is a diagram illustrating a general configuration of a steer-by-wire system to which a steering control device of an embodiment is applied.

There is a technology regarding output limiting in a steering apparatus of a vehicle. For example, when an energizing current to an assist motor is limited in an electric power steering system, a steering control device achieves a turning target value by controlling a braking force of the vehicle.

Further, for a steering control device of a steer-by-wire system, there is a technology related to a difference between a target value depending on an operation amount of a steering member and an actual value given by a driving device. For example, a steering device applies a reaction force to an operation member according to a steady-state difference between a target value and an actual value in feedback control.

Unlike an electric power steering system, a reaction force device of the steer-by-wire system may have such difficulty that when an output torque of a turning device is limited due to overheating or the like, a driver cannot recognize the output torque limited state.

The present disclosure is made in view of the foregoing in some aspects. For a reaction force device of a steer-by-wire system, it is an object of the present disclosure to provide a steering control device that causes a driver to recognize that a turning device is in an output-limited state.

In an aspect of the present disclosure, a steering control device for use in a seer-by-wire system is provided. The steer-by-wire system includes a reaction force device, a turning device and a torque sensor. The steering control device controls the reaction force device and the turning device.

The reaction force device includes a reaction-force-use rotary electric machine and a reaction-force-use power converter for driving the reaction-force-use rotary electric machine, and is connected to a steering wheel. The turning device includes a turning-use rotary electric machine and a turning-use power converter for driving the turning-use electric machine, and turns tire wheels. The torque sensor detects a steering input of a driver.

The steering control device includes an angle controller, a turning device current limit determiner, a current limit presentation controller, a reaction force controller, a steering wheel torque controller, an end controller (580) and a reaction force device current controller.

The angle controller performs control so that angle of the turning device matches angle of the reaction force device. In some embodiments, the angle of the turning device and the angle of the reaction force device may be values obtained by multiplying and/or dividing the angles by conversion factors. The turning device current limit determiner determines that the turning device is in an output-limited state. The current limit presentation controller calculates a current limit presentation command value so as to convey to the driver that the turning device current limit determiner has determined that the turning device is in the output-limited state.

The reaction force controller calculates a steering torque command value on a basis of a physical quantity corresponding to an output torque of the turning device. The steering wheel torque controller calculates a basic reaction force torque command value being a basic value of a reaction force torque command value so that a detection value of the torque sensor follows a target value that is based on the steering torque command value. The end controller calculates an end presentation command value to present to the driver that the angle of the reaction force device approaches or reaches an end being a rotation limit.

The reaction force device current controller controls a current flowing to the reaction-force-use rotary electric machine on a basis of the basic reaction force torque command value and the end presentation command value. When the turning device is in the output-limited state, the current limit presentation controller increases an absolute value of the current limit presentation command value In this steering control device, when the current flowing to the turning-use rotary electric machine is limited due to overheating or power limiting in the turning device, the current limit presentation controller calculates the current limit presentation command value. By reflecting the current limit presentation command value on the reaction force command value, it becomes possible to cause the driver to recognize that the turning device is in the output limited state.

An embodiment of a steering control device will be specifically described with reference to the drawings. The steering control device controls a reaction force device and a turning device in a steer-by-wire system.

FIG. 1 illustrates a general configuration of a steer-by-wire system 90 in which a steering mechanism (e.g., a mechanism including a steering wheel) and a turning mechanism (e.g., a mechanism including tire wheels) are mechanically separated. In FIG. 1, only one of tire wheels 99 is illustrated, and the illustration of the other tire wheels 99 is omitted. The steer-by-wire system 90 includes a reaction force device 70, a turning device 80, and a torque sensor 94.

The reaction force device 70 includes a reaction-force-use rotary electric machine 78, a reaction-force-use power converter 77 for driving the reaction-force-use rotary electric machine 78, and a reaction-force-use reducer 79 for reducing an output of the reaction-force-use rotary electric machine 78. The reaction force device 70 is connected to a steering wheel 91 via a steering shaft 92. With the steer-by-wire system 90, a driver cannot directly sense a reaction force in response to steering. Therefore, the reaction-force-use rotary electric machine 78 rotates the steering wheel 91 so as to apply a reaction force in response to the steering, and gives an appropriate steering feeling to the driver.

The turning device 80 includes a turning-use rotary electric machine 88, a turning-use power converter 87 for driving the turning-use rotary electric machine 88, and a turning-use reducer 89 for reducing an output of the turning-use rotary electric machine 88. Rotation of the turning-use rotary electric machine 88 is transmitted from the turning-use reducer 89 to the tire wheels 99 via a pinion gear 96, a rack shaft 97, tie rods 98, and knuckle arms 985. Specifically, rotational movement of the pinion gear 96 is converted into linear movement of the rack shaft 97, and the tie rods 98 provided at both ends of the rack shaft 97 reciprocate the knuckle arms 985, thereby to turn the tire wheels 99.

The torque sensor 94 detects a steering input of the driver applied to the steering shaft 92 on a basis of a torsional displacement of a torsion bar. A detection value T_sns of the torque sensor 94 is input to the steering control device 200.

Steering angle of the steering wheel 91 is defined with respect to a neutral position of the steering wheel 91. For example, the steering angle of the steering wheel 91 is positive when the steering wheel 91 is rotated with respect to the neutral position in a clockwise (CW) direction and negative when the steering wheel 91 is rotated with respect to the neutral position in a counter clockwise (CCW) direction illustrated in FIG. 1. Correspondingly, positive and negative of steered angle of the tire wheel 99 are defined. Angular velocity is defined with the same sign (positive, negative) as the angle. The detection value T_sns of the torque sensor 94 when the driver turns the steering wheel 91 in the CW direction is positive.

Output torque of the reaction force device 70 when the steering wheel 91 is rotated in the CW direction by the reaction force device 70 is also positive. When the driver retains the steering wheel 91 while the output torque of the reaction force device 70 is acting in the CW direction, the driver applies torque in the CCW direction, and accordingly, the detection value T_sns of the torque sensor 94 becomes negative.

The steering control device 200 includes, as its main components, microcomputers and the like. A CPU, a ROM, a RAM, an I/O, a bus line connecting these components, and the like of the microcomputer are provided inside the steering control device 200. The steering control device 200 may execute a respective process as a software process or a hardware process or a combination of a software process and a hardware process. The steering control device 200 may execute the software process by the CPU executing a program stored in a memory device such as a computer-readable non-transitory tangible storage medium, for example, a ROM. The steering control device 200 may execute a process by a dedicated electronic circuit.

As illustrated in FIG. 1, in the present embodiment, a reaction force device controller 270 and a turning device controller 280 are provided in a physically separated state. The two controllers 270 and 280 cooperate with each other to function as the steering control device 200 by communicating information with each other via a vehicle network such as CAN communication, a dedicated communication line and the like.

For example, as indicated by the two-dot chain line, the reaction force device 70 includes the reaction force device controller 270, a reaction-force-use power converter 77, and a reaction-force-use rotary electric machine 78 which are provided as an integrated configuration. Similarly, the turning device 80 includes the turning device controller 280, a turning-use power converter 87, and a turning-use rotary electric machine 88 which are provided as an integrated configuration. This kind of so-called a "machine-electric integrated type" motor structure is well known in the field of electric power steering devices.

Figure 2:
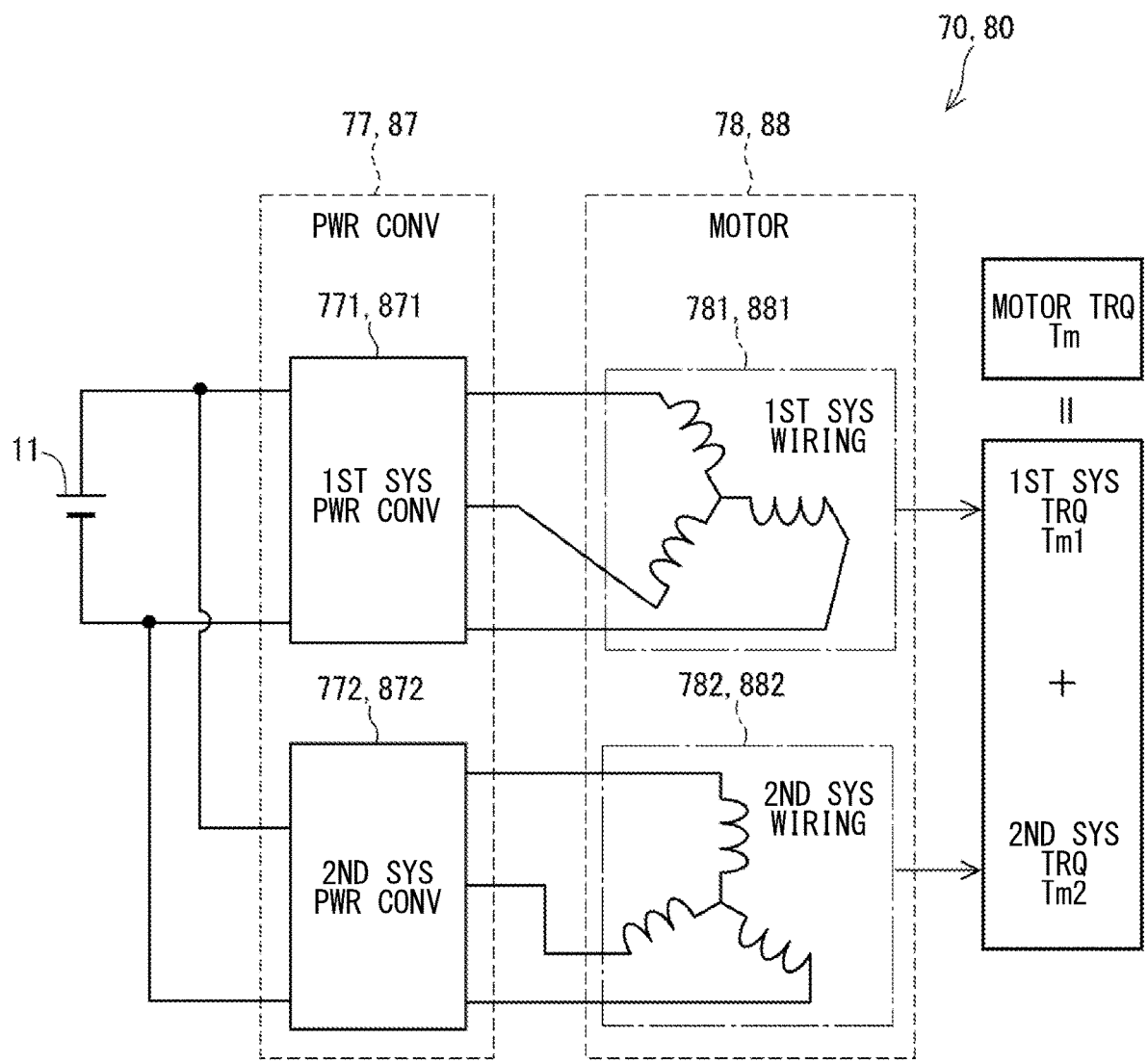
FIG. 2 is a diagram illustrating a schematic configuration a reaction force device and a turning device provided in two systems.

Next, with reference to FIG. 2, configurations of the power converters 77 and 87 and the rotary electric machines 78 and 88 in the reaction force device 70 and the turning device 80 will be described specifically. Since the reaction force device 70 and the turning device 80 have a similar configuration, FIG. 2 illustrate reference signs for the both of the reaction force device 70 and the turning device 80. In the following description, the phrases "reaction-force-use" and "turning-use" may be omitted, and the reference signs of the components of the reaction force device 70 may be used as representatives of the both. It is to be understood that the description of the reaction force device 70 gives the description of the turning device 80 by reference sign replacements.

The rotary electric machine 78 according to the present embodiment is provided as three-phase brushless motors of two systems, and the power converter 77 is provided as three-phase inverters of the two system. The rotary electric machines 78 include a first system winding 781 and a second system winding 782 as windings of the two systems. The windings 781 and 782 of the two systems are arranged to have phase shift by an electrical angle of 30 degrees, for example. A torque Tm output by the rotary electric machine 78 is the sum of a first system torque Tm1 generated by energizing the first system winding 781 and a second system torque Tm2 generated by energizing the second system winding 782.

The power converter 77 includes a first system power converter 771 for energizing the first system winding 781 and a second system power converter 772 for energizing the second system winding 782. In the example of FIG. 2, each of the two-system power converters 771 and 772 converts a direct-current (DC) power supplied from a common (shared) battery 11 into a three-phase alternating-current (AC) power. In another example, the power converters 771, 772 may be connected to respective individual batteries.

Next, basic configurations of the reaction force device controller 270 and the turning device controller 280 will be described with reference to FIG. 3 and FIG. 4. The description of this basic configuration is for understanding of general controls of the reaction force device 70 and the turning device 80 in the steer-by-wire system 90, in advance of the description of control configurations specific to the present embodiment illustrated in FIG. 5. Symbols of parameters relating to the output of the reaction force device 70 are provided with "r", and symbols of parameters relating to the output of the turning device 80 are provided with "t". Hereinafter, the reference numerals "70" and "80" of the reaction force device 70 and the turning device 80 may be omitted.

Figure 3:
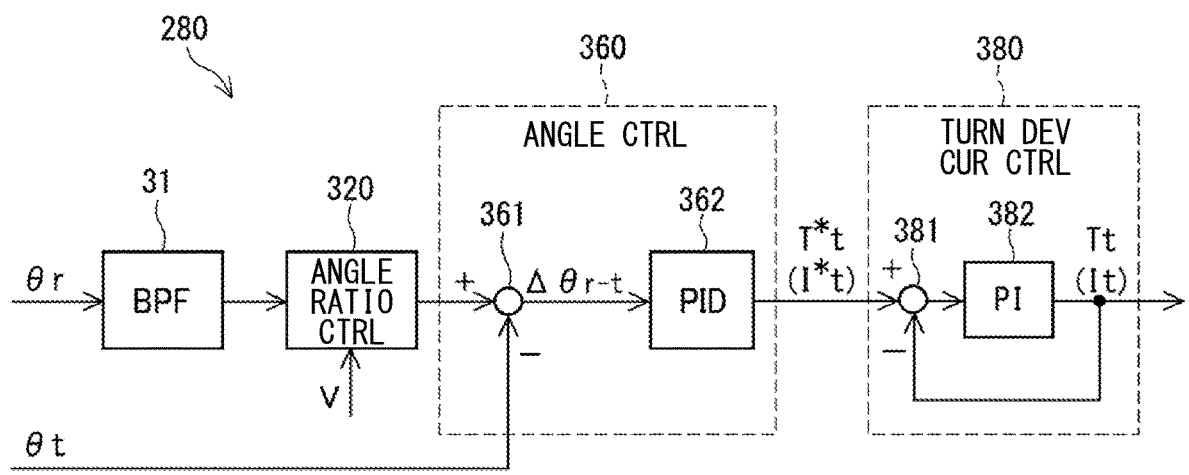
FIG. 3 is a block diagram illustrating a basic configuration of a turning device controller.
Figure 4:
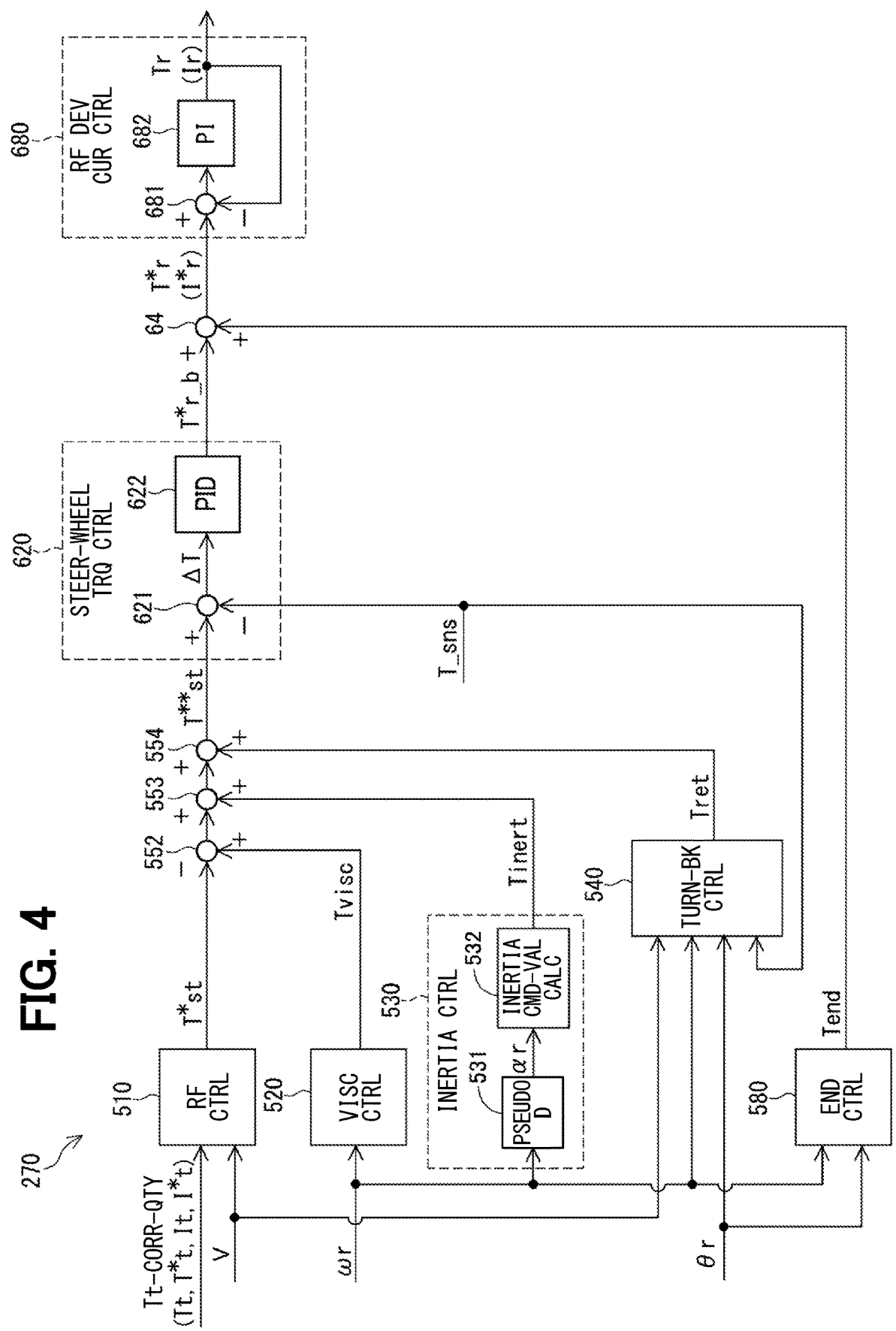
FIG. 4 is a block diagram illustrating a basic configuration of a reaction force device controller.

In FIG. 3 and FIG. 4, values such as angle $\theta r$ and angular velocity $\omega r$ of the reaction force device and angle $\theta t$ of the turning device 80 are values after conversion, wherein the conversion is multiplication or division of the rotation angle of the rotary electric machine 78, 88 by a reduction ratio of the reducer 79, 89. FIG. 3 illustrates the schematic configuration of the turning device controller 280. The angle $\theta r$ of the reaction force device is input to an angle ratio controller 320 via a band pass filter (BPF) 31. The angle ratio controller 320 calculates the angle ratio between the reaction force device 70 and the turning device 80 according to the angle $\theta r$ and/or vehicle speed V.

A difference calculator 361 of an angle controller 360 calculates an angle difference $\Delta\theta r-t$ between the value obtained by multiplying the angle $\theta r$ of the reaction force device 70 by the angle ratio and the angle $\theta t$ of the turning device 80. A PID controller 362 calculates a turning torque command value T*t or a current command value I*t of the turning-use rotary electric machine 88 corresponding to the turning torque command value T*t so that the angle difference $\Delta\theta r-t$ approaches 0. A turning device current controller 380 includes a difference calculator 381 and a PI controller 382, and controls the current to be supplied to the turning-use rotary electric machine 88 by feedback control of the turning torque Tt or the current It.

To be precise, the angle difference $\Delta\theta$ calculated by the difference calculator 361 is a difference between "the value obtained by multiplying the angle $\theta r$ of the reaction force device by the angle ratio" and the angle $\theta t$ of the turning device. However, in the present description, "the value obtained by multiplying the angle $\theta r$ of the reaction force device by the angle ratio" is regarded as "the angle $\theta r$ of the reaction force device 70", and "the difference between the angle $\theta r$ of the reaction force device and the angle $\theta t$ of the turning device" is referred to as "angle difference $\Delta\theta r-t$". Specifically, distinguishing whether a rotation operation of the reaction force device 70 and a rotation operation of the turning device 80 are appropriately in synchrony is important, and in the distinguishing, values obtained by multiplication and/or division with conversion factors may be used for comparison. On this basis, "the angle controller 360 performs control so that the angle $\theta t$ of the turning device matches the angle $\theta r$ of the reaction force device" is to be interpreted.

FIG. 4 illustrates a basic configuration of the reaction force device controller 270. A steering wheel torque controller 620 calculates a basic reaction force torque command value T*r_b being a basic value of a reaction force torque command value on a basis of torque command values that, respectively, are calculated by a reaction force controller 510, a viscosity controller 520, an inertia controller 530, and a turn-back controller 540.

By a reaction force control that is based on "a physical quantity corresponding to the output torque of the turning device", the reaction force controller 510 calculates a reaction force command value of the reaction force device. The reaction force controller 510 further calculates a turning torque command value T*st by multiplying the reaction force command value Trf by a vehicle speed gain corresponding to the vehicle speed V. Herein, "the physical quantity corresponding to the output torque of the turning device" may be the turning torque Tt, the turning torque command value T*t, the current command value I*t, a current It flowing to the turning-use rotary electric machine 88, or the like. Hereinafter, "the physical quantity corresponding to the output torque of the turning device" will be abbreviated as a "turning torque corresponding quantity".

The viscosity controller 520 calculates a viscosity command value Tvisc of the reaction force device by a viscosity control, wherein the viscosity control is based on "a physical quantity corresponding to the rotational angular velocity $\omega r$ of the reaction force device". In FIG. 4, the symbol "$\omega r$" is illustrated as a representative of "the physical quantity corresponding to the rotational angular velocity $\omega r$ of the reaction force device". In the description, the phrase "rotational angular velocity $\omega r$" is also simply referred to as "angular velocity $\omega r$".

Figure 5:
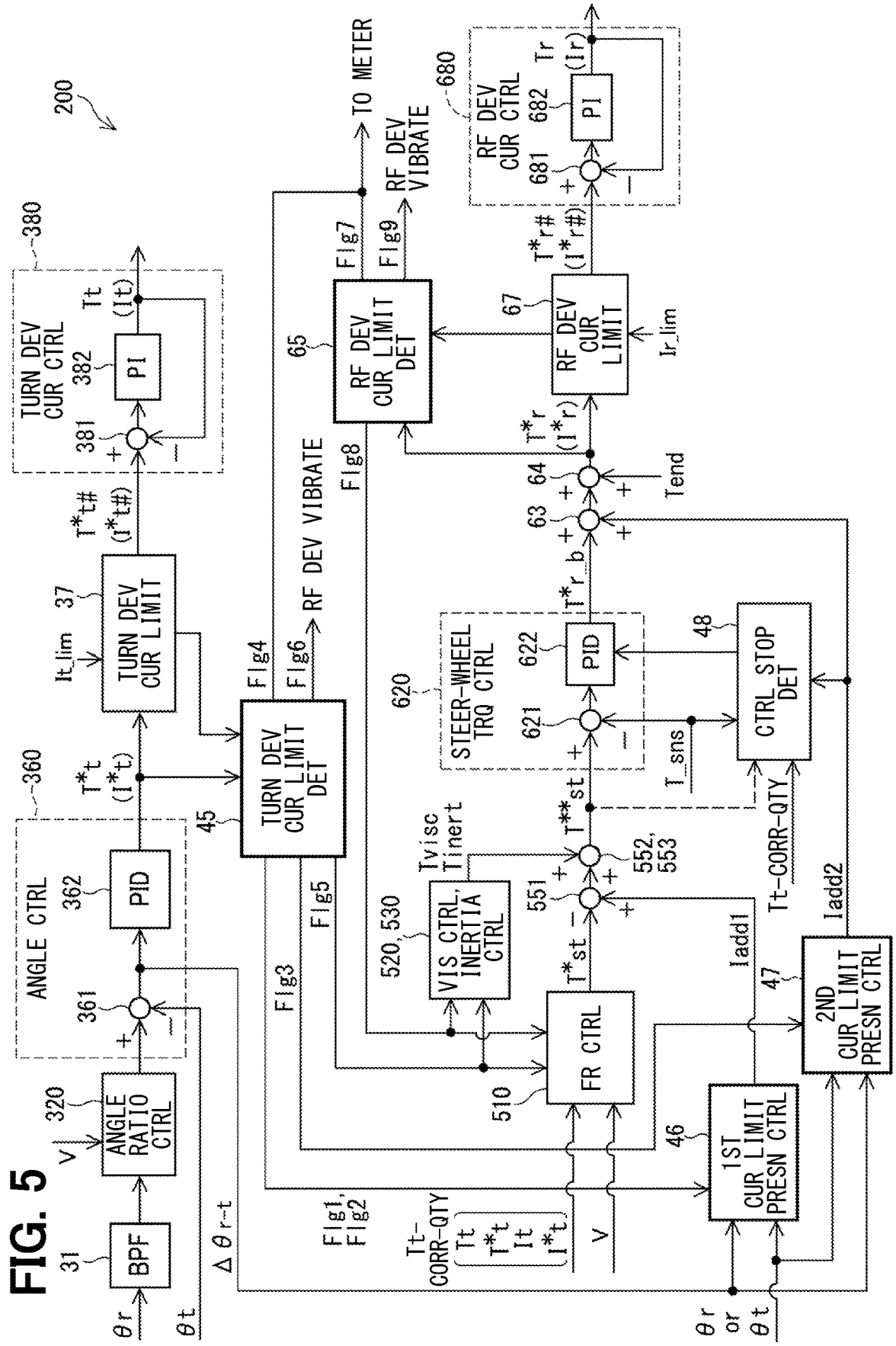
FIG. 5 is a control block diagram of a steering control device according to an embodiment.

As illustrated in FIG. 5, the inertia controller 530 includes a pseudo differentiator 531 and an inertia command value calculator 532. The pseudo differentiator calculates a rotational angular acceleration $\alpha r$ from a change rate of the rotational angular velocity $\omega r$. The inertia command value calculator 532 performs inertia command value calculation based on the rotational angular acceleration $\alpha r$. The inertia controller 530 calculates an inertia command value Tinert of the reaction force device, by an inertial control that is based on "a physical quantity corresponding to the rotational angular acceleration αr of the reaction force device". In FIG. 5, the symbol "ωr" is illustrated as a representative of "the physical quantity corresponding to the rotational angular velocity ωr of the reaction force device".

The turn-back controller 540 calculates a turn-back command value Tret for acting in a direction to turn back the steering wheel 91 to the neutral position, on a basis of the angle θr and the angular velocity ωr of the reaction force device, the vehicle speed V, and the detection value T_sns of the torque sensor 94.

In adders 552, 553, 554, the viscosity command value Tvisc, the inertia command value Tinert, and the turn-back command value Tret are sequentially added to a sign inversion value (−T*st) of the steering torque command value T*st. The value after the addition by the adder 554 is input to the steering wheel torque controller 620 as "a target value T**st based on the steering torque command value T*st".

A difference calculator 621 of the steering wheel torque controller 620 calculates a torque difference $\Delta T_{FB}$ between the target value T**st and the detection value T_sns of the torque sensor 94. A PID controller 622 performs a PID control so that the torque difference ΔT approaches 0. In this way, the steering wheel torque controller 620 calculates a reaction force torque command value T*r by servo control so that the detection value T_sns of the torque sensor 94 follows the target value T**st.

An end controller 580 calculates an end presentation command value Tend on a basis of the angle θr and the angular velocity ωr of the reaction force device. The end presentation command value Tend is a command value for presenting to the driver that the angle θr of the reaction force device approaches or reaches the end being the rotation limit. The end presentation command value Tend is added to the basis reaction force torque command value T*r_b by an adder 64.

A reaction force device current controller 680 includes a difference calculator 681 and a PI controller 682. By a feedback control of the reaction force torque Tr or the current Ir, the reaction force device current controller 680 controls an electric current flowing to the reaction-force-use rotary electric machine 78, on a basis of the reaction force torque command value T*r.

One Embodiment

Next, a control configuration of the steering control device 200 according to one embodiment will be described with reference to FIGS. 5 to 7. In addition to the basic configuration of the turning device controller 280 and the reaction force device controller 270 illustrated in FIGS. 3 and 4, FIG. 5 illustrates a configuration specific to the present embodiment. Part of the basic configuration of the reaction force device controller 270 is omitted from FIG. 5. For example, the viscosity controller 520 and the inertia controller 530 are illustrated as one block for the sake of space, and the turn-back controller 540 and the end controller 580 are not illustrated in FIG. 5.

In the following description, the steering control device 200 as a whole is regarded as one control unit, and control roles of the turning device controller 280 and the reaction force device controller 270 that will not be mentioned do not matter. For example, a turning device current limit determiner 45 may be provided in either the turning device controller 280 or the reaction force device controller 270.

A turning device current limiter 37 is provided in process of calculating the steering torque command value T*t. The turning device current limiter 37 limits the turning device current It to a current limit value It_lim or less in order for overheating protection, power limiting, power supply drop prevention and the like of the turning device 80. The steering torque command value and the turning device current command value before the limiting by the turning device current limiter 37 are written as T*t, I*t, respectively. The turning torque command value and the turning device current command value after the limiting are T*t#, I*t#, respectively. When the absolute value |I*t| of the turning device current command value before the limiting exceeds the current limit value It_lim, the turning device 80 is in the output-limited state due to the current limit. Here, in the two-system configuration as illustrated in FIG. 2, when the total value of the outputs of the power converters 871 and 872 of the two systems is in the limited state, it is determined that the turning device 80 is in the output-limited state.

The turning device current limit determiner 45 determines that the turning device 80 is in the output-limited state, on a basis of an input to the turning device current limiter 37 stand a signal from the turning device current limiter 37. Then, the turning device current limit determiner 45 switches over a first flag Flg1 to a sixth flag Flg6 between the ON and OFF by performing the turning device current limit determination processing illustrated in FIG. 8.

The first flag Flg1 and the second flag Flg2 are notified to a first current limit presentation controller 46, and the third flag Flg3 is notified to a second current limit presentation controller 47. The fourth flag Flg4 is notified to a meter (e.g., a display in an instrument panel) of the vehicle and used as a condition for turning on a warning lamp. The fifth flag Flg5 is notified to the reaction force controller 510, the viscosity controller 520, and the inertia controller 530. The sixth flag Flg6 is notified to a vibration actuator (not shown).

The angle difference Δθr−t calculated by the angle controller 360 is output to the first current limit presentation controller 46 and the second current limit presentation controller 47. Although not shown, the angle difference Δθr−t is also notified to a destination to which the fourth flag Flg4 to the sixth flag Flg6 are notified. Alternatively, the angle difference Δθr−t is notified to the turning device current limit determiner 45. When the absolute value |Δθr−t| of the angle difference is equal to or greater than a predetermined value, the output torque Tt of the turning device 80 is limited and a normal rotational operation cannot be performed, and an estimated possibility is an occurrence of mismatch between the angle θr of the reaction force device and the angle θt of the turning device.

The first current limit presentation controller 46 and the second current limit presentation controller 47 calculate current limit presentation command values Iadd1 and Iadd2 so as to notify the driver that it is determined by the turning device current limit determiner 37 that the turning device 80 is in the output-limited state. The current limit presentation command values Iadd1 and Iadd2 may be set as torque values. Alternatively, the current limit presentation command values Iadd1 and Iadd2 may be set as current values and converted to torque values when compared with, added to or subtracted from other torque values.

The first current limit presentation controller 46 calculates the first current limit presentation command value Iadd1 which is to be added to the sign inversion value (−T*st) of the steering torque command value T*st calculated by the reaction force controller 510. The second current limit presentation controller 47 calculates a second current limit presentation command value Iadd2 which is added to the basic reaction force torque command value T*r_b calculated by the steering wheel torque controller 620.

The angle difference Δθr–t is input to the first current limit presentation controller 46 and the second current limit presentation controller 47. Further, the angle θr of the reaction force device or the angle θt of the turning device is input to the first current limit presentation controller 46 and the second current limit presentation controller 47. As will be described later with reference to FIGS. 11 and 12, the current limit presentation controllers 46 and 47 switch over "near end" signal between ON and OFF on a basis of the angle θr of the reaction force device or the angle θt of the turning device.

Figure 6A:
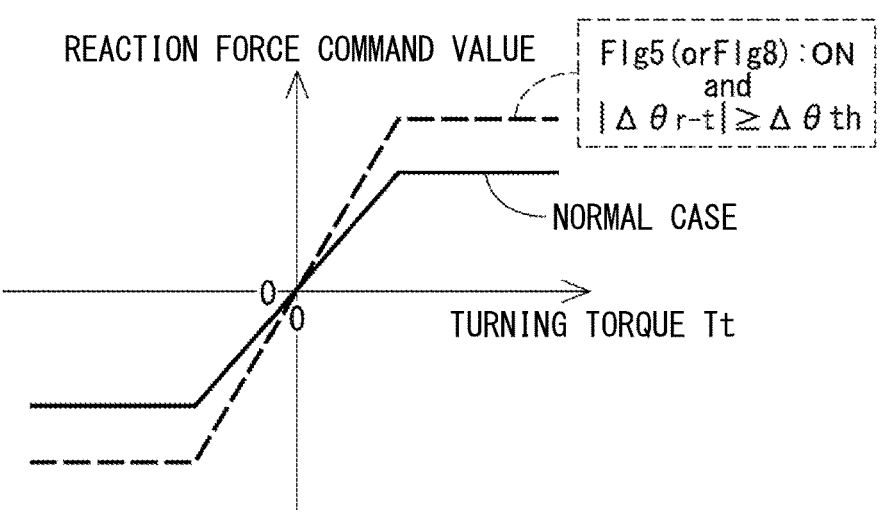
FIG. 6A is a diagram illustrating a map for reaction force control.

Next, with reference to FIG. 6, explanation will be given on switchover of characteristics of the reaction force control of the reaction force controller 510, the viscosity control of the viscosity controller 520, and the inertia control of the inertia controller 530. A map in FIG. 6A illustrates a relationship between the torque Tt of the turning device 80 and the reaction force command value in the reaction force controller 510. In the normal state where the output of the turning device 80 is not limited, the characteristic is that shown by the solid line. When the fifth flag Flg5 is ON and the absolute value |Δθr–t| of the angle difference is equal to or greater than a predetermined angle difference threshold Δθth, a constant of the reaction force control is switched over to a value that causes an increase in the absolute value of the reaction force command value as shown in by the broken line. That is, the characteristic of the reaction force control is switched over to a characteristic where the driver is more difficult to rotate the steering wheel.

Figure 6B:
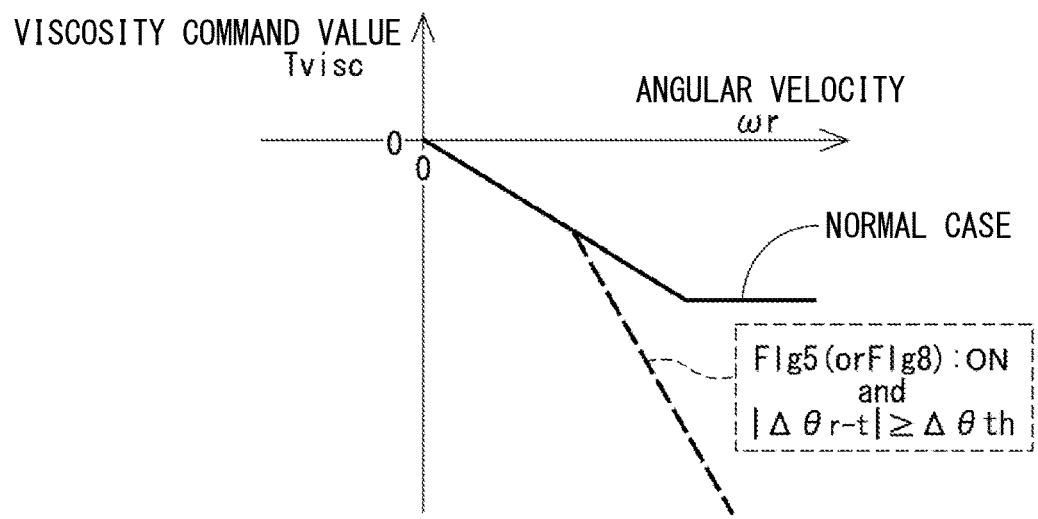
FIG. 6B is a diagram illustrating a map for viscosity control.

A map of FIG. 6B illustrates A relationship between the rotational angular velocity ωr of the reaction force device 70 and the viscosity command value Tvisc in the viscosity controller 520. In the normal state where the output of the turning device 80 is not limited, the characteristic is that shown by the solid line. When the fifth flag Flg5 is ON and the absolute value |Δθr–t| of the angle difference is equal to or greater than the predetermined angle difference threshold Δθth, a constant of viscosity control is switched over to a value that causes an increase the absolute value of the viscosity command value Tvisc as shown by the broken line. Specifically, the characteristic of the viscosity control is switched over to a characteristic that causes the driver to be more difficult to rotate the steering wheel. In cases where a viscosity component of a gear or a motor is large and the viscosity controller normally operates to reduce the viscosity, the viscosity command value Tvisc is increased to a value where the absolute value is small or the viscosity of the gear is increased.

Figure 6C:
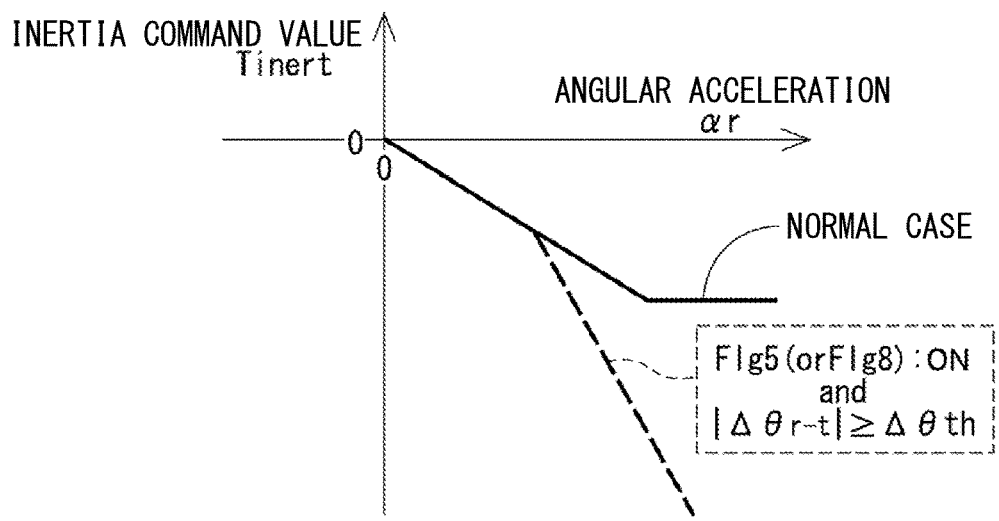
FIG. 6C is a diagram illustrating a map for inertia control.

A map in FIG. 6C illustrates a relationship between the rotational angular acceleration αr of the reaction force device 70 and the inertia command value Tinert in the inertia controller 530. In the normal state where the output of the turning device 80 is not limited, the characteristic is that shown by the solid line. When the fifth flag Flg5 is ON and the absolute value |Δθr–t| of the angle difference is equal to or greater than the predetermined angle difference threshold Δθth, a constant of the inertia control is switched over to a value that causes an increase in the absolute value of the inertia command value Tinert as shown by the broken line. Specifically, the characteristic of the inertial control is switched to a characteristic where the driver is more difficult to rotate the steering wheel. In cases where an inertia component of the gear or the motor is large and the inertia controller normally operates to reduce the inertia, the inertia command value Tinert is increased to a value where the absolute value is small or the inertia is increased.

The characteristic of not all of but at least one of the reaction force control, the viscosity control, and the inertial control may be switched over. For example, in cases where the steering control device does not have the inertial controller 530, the switchover of the characteristic of the inertial control may be excluded. Generally speaking, when the fifth flag Flg5 is ON and the absolute value of the angle |Δθr–t| difference is equal to or greater than the predetermined angle difference threshold Δθth, the turning device current limit determiner 45 issues a command to switch over the characteristic of at least one of the reaction force control, the viscosity control, and the inertial control to a characteristic that causes the steering wheel to be more difficult to rotate than the before the switch over.

The description returns to FIG. 5. In an adder 551, the first current limit presentation command value Iadd1 is added to the sign inversion value of the steering torque command value T*st calculated by the reaction force controller 510. In the adders 552 and 553, the viscosity command value Tvisc or the inertia command value Tinert is further added to the output of the adder 551, and the value after the addition is input to the steering wheel torque controller 620 as a target value T**st that is based on the steering torque command value T*st.

The steering wheel torque controller 620 calculates the basic reaction force torque command value T*r_b by the servo control in which the detected value T_sns of the torque sensor 94 follows the target value Tst. In the adder 63**, the second current limit presentation command value Iadd2 is added to the basic reaction force torque command value T*r_b. In the adder 64, the end presentation command value Tend is further added.

Since the steering wheel torque controller 620 operates to cause the detected value T_sns of the torque sensor 94 follow the target value Tst, when the second current limit presentation command value Iadd2 is a value other than 0, the second current limit presentation command value Iadd2 is cancelled out by the steering wheel torque controller 620. In view of this, a control stop determiner 48 make a determination as to stop of the control of the steering wheel torque controller 620** according to magnitude of the second current limit presentation command value Iadd2.

The control stop determiner 48 acquires the turning torque Tt corresponding quantity, the detection value T_sns of the torque sensor 94, and the second current limit presentation command value Iadd2. Alternatively, the control stop determiner 48 may further acquire the target value Tst which is the input of the steering wheel torque controller 620**, as shown by the broken line.

For example, the control stop determiner 48 stops the control of the steering wheel torque controller 620 when: the absolute value |Iadd2| of the second current limit presentation command value is substantially 0 larger than an offset variation of the torque sensor 94; or the absolute value |Iadd2| of the second current limit presentation command value is larger than a predetermined value corresponding to an upper limit value of the torque sensor 94. In the configuration where the control stop determiner 48 acquires the target value Tst, the control stop determiner 48 stops the control of the steering wheel torque controller 620 when the absolute value |Iadd2| of the second current limit presentation command value is larger than the absolute value |Tst| of the target value.

Figure 7:
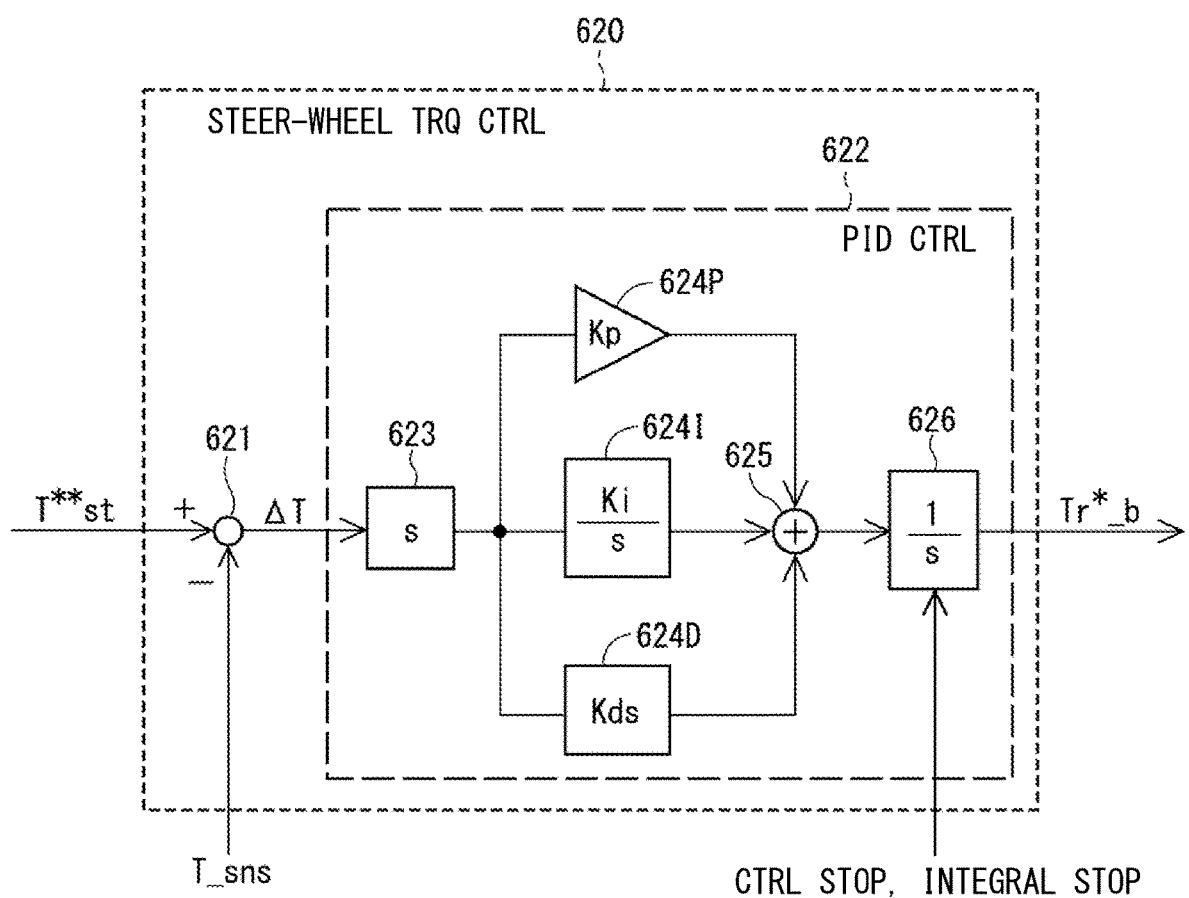
FIG. 7 is a control block diagram of a PID controller of a steering wheel torque controller.

With reference to FIG. 7, explanation will be given on a specific configuration relating to the control stop. FIG. 7 illustrates a configuration example of the PID controller 622 of the steering wheel torque controller 620. This configuration is application of a configuration of an assist controller disclosed in FIG. 4, paragraphs [0034] and [0035] of JP-6299087B incorporated herein by reference. The PID controller 622 includes a differential calculator 623, a proportional controller 624P, an integral controller 624I, a differential controller 624D, an adder 625, and an integral calculator 626. The PID controller 622 performs feedback-control of the output torque of the reaction force device 70.

The differential calculator 623 differentiates the input torque difference $\Delta T$. The proportional controller 624P performs P control using a proportional gain Kp. The integral controller 624I performs I control using an integral gain Ki. The differential controller 624D performs D control using a differential gain Kd. The adder 625 adds the outputs of the P control, the I control and the D control.

The integral calculator 626 is provided at a last stage of the steering wheel torque controller 620, and performs integral of the added value of the adder 625 and outputs the integral value. In this configuration, when the control of the steering wheel torque controller 620 is stopped, the integral calculation by the integral calculator 626 is stopped. The feedback control calculation by the controllers 624P, 624I, and 624D is continued during the stop of the integral calculation.

The description returns to FIG. 5. A reaction force device current limiter 67 is provided in process of calculating the reaction force torque command value T*r. The reaction force device current limiter 67 limits the reaction force device current Ir to a current limit value Ir_lim or less in order for overheating protection, power limiting, power drop prevention and the like of the reaction force device 70. The reaction force torque command value before the limiting by the reaction force device current limiter 67 is written as T*r. The reaction force device current command value before the limiting by the reaction force device current limiter 67 is written as I*r. The reaction force torque command value after the limiting is T*r #. The reaction force device current command value after the limiting is I*r #. When an absolute value |I*r| of the reaction force device current command value before the limiting exceeds the current limit value Ir_lim, the reaction force device 70 is in the output-limited state due to the current limiting. In the two-system configuration as illustrated in FIG. 2, when the total value of the outputs of the power converters 771 and 772 of the two systems is in the limited state, it is determined that the reaction force device 70 is in the output-limited state.

A reaction force device current limit determiner 65 determines that the reaction force device 70 is in the output-limited state, on a basis of an input to the reaction force device current limiter 67 and information from the reaction force device current limiter 67. The reaction force device current limit determiner 65 performs ON/OFF switchover of the seventh flag Flg7 to the ninth flag Flg9 by performing the reaction force device current limit determination processing illustrated in FIG. 14.

The seventh flag Flg7 to the ninth flag Flg9 correspond to the fourth flag Flg4 to the sixth flag Flg6 of the turning device current limit determiner 45. Specifically, the seventh flag Flg7 is notified to a meter of the vehicle and is used as a condition for turning on a warning lamp. The eighth flag Flg8 is notified to the reaction force controller 510, the viscosity controller 520, and the inertia controller 530. The ninth flag Flg9 is notified to a vibration calculator or a vibration actuator of a reaction force device (not shown).

Although not illustrated, the angle difference $\Delta\theta r$–t is also notified to a destination to which the seventh flag Flg7 to the ninth flag Flg9 are notified. Alternatively, the angle difference $\Delta\theta r$–t is notified to the reaction force device current limit determiner 65. When the absolute value $|\Delta\theta r$–t$|$ of the angle difference is equal to or greater than a predetermined value, the output torque Tt of the reaction force device 70 is limited and a normal rotational operation cannot be performed, and an estimated possibility is an occurrence of mismatch between the angle $\theta r$ of the reaction force device and the angle $\theta t$ of the turning device.

As shown by "Flg5 (or Flg8)" in FIGS. 6A to 6C, the switchover of the reaction force control characteristic, the viscosity control characteristic and the inertia control characteristic by the eighth flag Flg8 is similar to that by the fifth flag Flg5. Specifically, when the eighth flag Flg8 is ON and the absolute value $|\Delta\theta r$–t$|$ of the angle difference is equal to or greater than the predetermined angle difference threshold $\Delta\theta th$, the reaction force device current limit determiner 65 issues a command to switch over a characteristic of at least one of the reaction force control, the viscosity control and the inertial control into a characteristic that causes the steering wheel to be more difficult to rotate than before the switch over.

Next, with reference to the flowcharts of FIGS. 8 to 13, processing/processes by the turning device current limit determiner 45, the first current limit presentation controller 46, the second current limit presentation controller 47, and the control stop determiner 48 will be described. In the following description of the flowcharts, the symbol "S" denotes a step. Further, the processing with "return" at the bottom thereof is processing repeatedly executed, and a result given in a previous routine may be reflected in a current routine.

Figure 8:
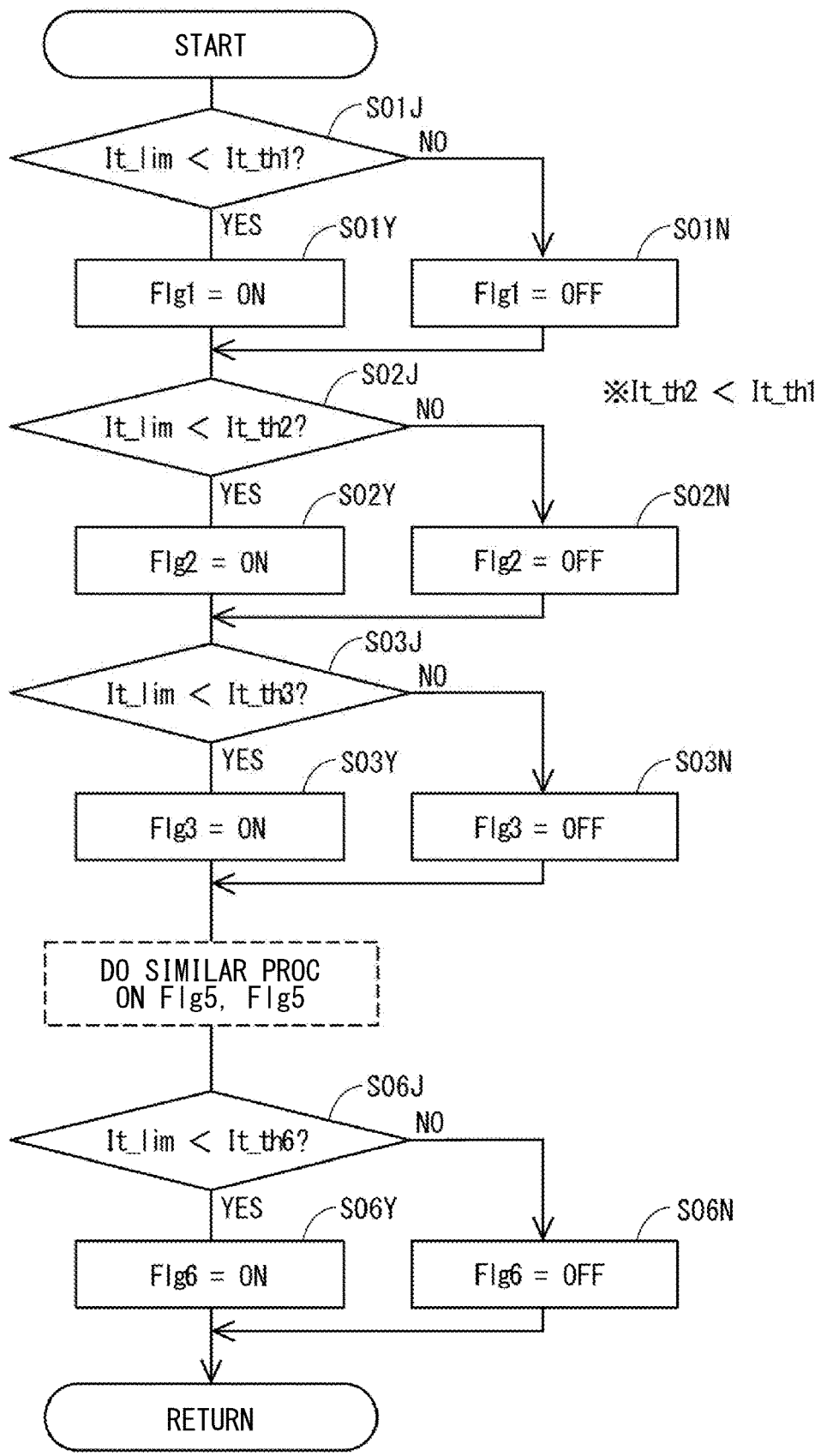
FIG. 8 is a flowchart illustrating FIG. ON/OFF switchover processes in turning device current limit determination processing.

An ON/OFF switchover process on the first flag Flg1 to the sixth flag Flg6 based on the turning device current limit value It_lim, which is included in the turning device current limit determination processing by the turning device current limit determiner 45, is illustrated in FIG. 8. In place of the current limit value It_lim, the absolute value |I*t–I*t#| of the current difference between before and after the limiting by the turning device current limiter 37 may be used in the ON/OFF switchover process.

In S01J, it is determined whether the turning device current limit value It_lim is smaller than the first current threshold It_th1. In the case of YES in S01J, the first flag Flg1 is set to ON in S01Y. In the case of NO at S01J, the first flag Flg1 is set to OFF in S01N. In S02J, it is determined whether the turning device current limit value It_lim is smaller than the second current threshold It_th2. In the case of YES in S02J, the second flag Flg2 is set to ON in S02Y. In the case of NO in S02J, the second flag Flg2 is set to OFF in S02N. In the above, the second current threshold It_th2 is smaller than the first current threshold It_th1.

Similar processing is executed for the third flag Flg3 to the sixth flag Flg6. Specifically, it is determined whether the turning device current limit value It_lim is smaller than an n-th current threshold It_thn. In the case of YES in this determination, the n-th flag Flgn may be set to ON, and in the case of NO, the n-th flag Flgn may be set to OFF. Step numbers from S03J to S06N in FIG. 8 are omitted here. The third current threshold It_th3 to the sixth current threshold It_th6 may be set independently. Further, regarding the first current threshold It_th1 to the sixth current threshold It_th6, there is no restriction on magnitude relationship other than a relation between the first current threshold It_th1 and the second current threshold It_th2. When each of the flags Flg1 to Flg6 is ON, this indicates that the turning device 80 is in the output-limited state.

Figure 9:
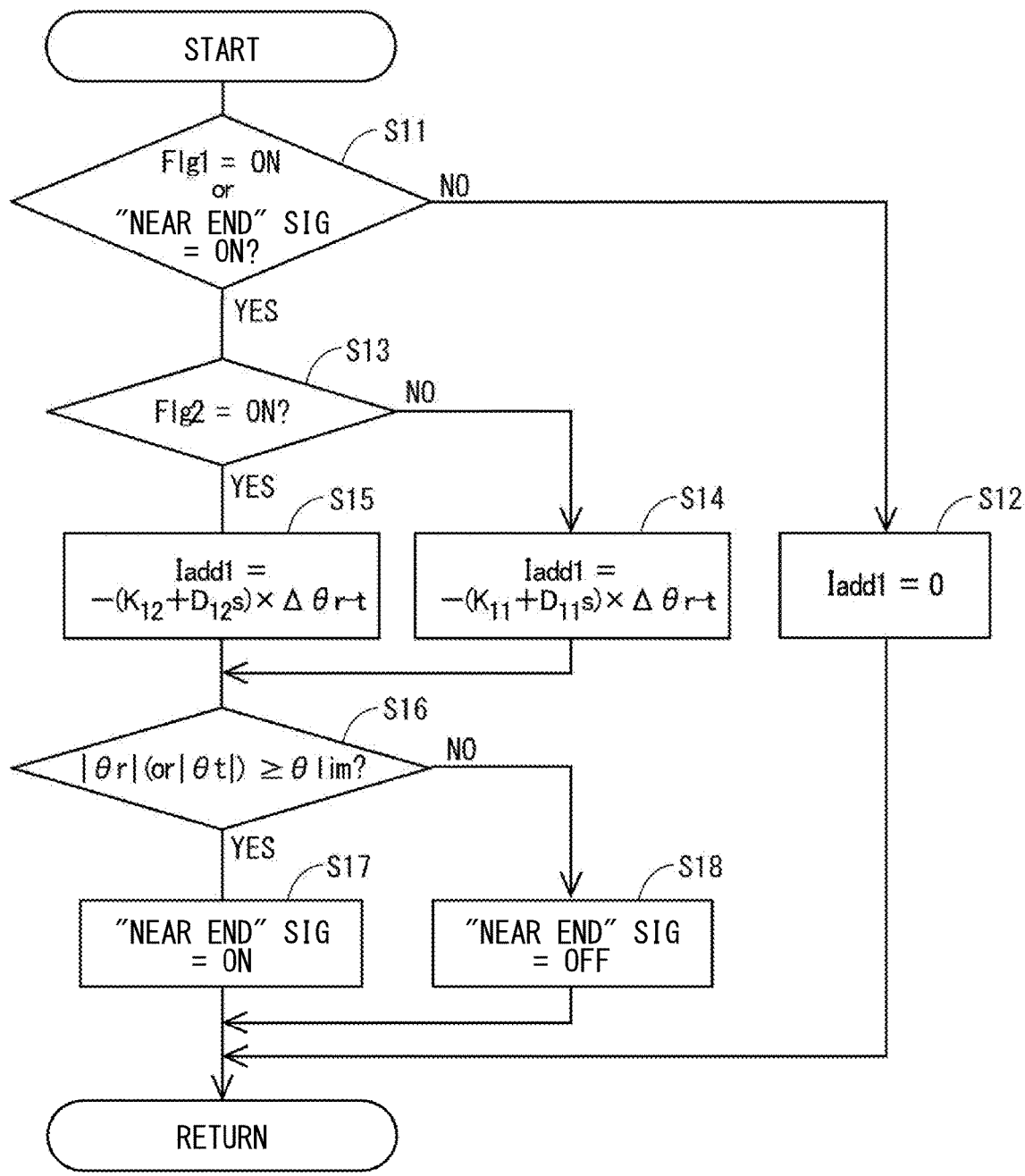
FIG. 9 is a flowchart illustrating first current limit presentation control processing.

FIG. 9 illustrates the first current limit presentation control processing by the first current limit presentation controller 46. In S11, it is determined whether the first flag Flg1 is ON or "the near end" signal in the previous routine is ON. In the case of NO in S11, the first current limit presentation command value Iadd1 is set to 0 in S12. In the case of YES in S11, it is determined in S13 whether the second flag Flg2 is ON.

In the case of NO in S13, the process proceeds to S14 where the first current limit presentation command value Iadd1 is calculated according to the angle difference Δθr−t by the equation (1.1). In the case of YES in S13, the process proceeds to S15 where the first current limit presentation command value Iadd1 is calculated according to the angle difference Δθr−t by the equation (1.2). The sign of the first current limit presentation command value Iadd1 is determined by the sign of the angle difference Δθr−t, that is, by the magnitude relationship between the angle θr of the reaction force device and the angle θt of the turning device.

$$Iadd1 = -(K_{11} + D_{11}s) \times \Delta\theta_{r-t} \qquad \text{Equation (1.1):}$$

$$Iadd1 = -(K_{12} + D_{12}s) \times \Delta\theta_{r-t} \qquad \text{Equation (1.2):}$$

Thus, even if the first flag Flg1 is OFF, when the "near end" signal is ON, the determination in S11 results in YES, and the first current limit presentation command value Iadd1 is calculated. Then, the calculation of the first current limit presentation command value Iadd1 is repeated until "the near end" signal becomes OFF. Specifically, even if the turning device 80 becomes out of the output-limited state while the angle θr of the reaction force device is being determined as near the end, the first current limit presentation controller 46 continues calculating the first current limit presentation command value Iadd1 until it is determined that the angle θr of the reaction force device is far from the end.

In the present embodiment, s denotes a differential operator, K11 and K12 denote coefficients of the proportional term, and D11 and D12 denote coefficients of the differential term. The coefficients K11 and K12 may be constant values or may be variably set according to the first current limit presentation command value Iadd1. For example, when the absolute value |Iadd1| of the first current limit presentation command value is small, the coefficients K11 and K12 may be set to substantially 0.

By S14 and S15, the first current limit presentation controller 46 increases the absolute value |Iadd1| of the first current limit presentation command value when the turning device 80 is in the output-limited state. Specifically, when the turning device 80 is in the output-limited state, the first current limit presentation controller 46 causes the absolute value |Iθr−t| of the angle difference to be larger as the absolute value |Iadd1| of the first current limit presentation command value is larger. In S16, it is determined whether the absolute value |θr| of the reaction force device angle or the absolute value |θt'| of the turning device angle is equal to or greater than a limit angle θlim. In the case of YES in S16, the "near end" signal is set to ON in S17. In the case of NO in S16, the "near end" signal is set to OFF in S18. The limit angle θlim is smaller than the rotation limit of the reaction force device.

Figure 10:
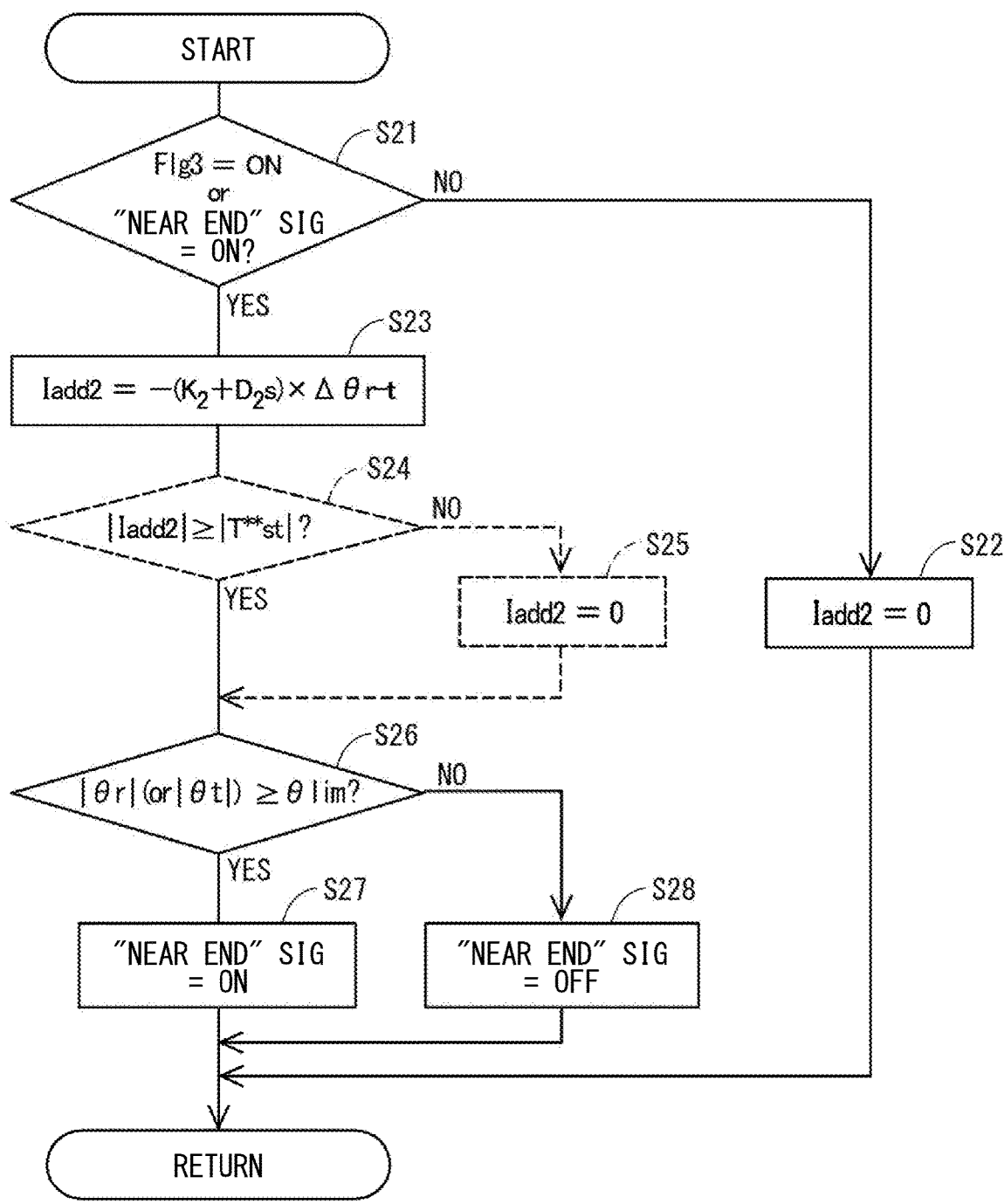
FIG. 10 is a flowchart illustrating second current limit presentation control processing.

FIG. 10 illustrates the second current limit presentation control processing by the second current limit presentation controller 47. In S21, it is determined whether the third flag Flg3 is ON or the "near end" signal in the previous routine is ON. In the case of NO in S21, the second current limit presentation command value add2 is set to 0 in S22. In the case of YES in S21, the process proceeds to S23 where the second current limit presentation command value Iadd2 is calculated according to the angle difference Δθr−t by the equation (2).

$$Iadd2 = -(K_2 + D_2s) \times \Delta\theta_{r-t} \qquad \text{The equation (2):}$$

In this way, even if the third flag Flg3 is OFF, when the "near end" signal is ON, the determination in S21 results in YES, and the second current limit presentation command value Iadd2 is calculated. The calculation of the second current limit presentation command value Iadd2 is repeated until the "near end" signal becomes OFF. Specifically, even if the turning device 80 becomes out of the output-limited state while the angle θr of the reaction force device is being determined as near the end, the second current limit presentation controller 47 continues calculating the second current limit presentation command value Iadd2 until it is determined that the angle θr of the reaction force device is far from the end.

In a manner similar to the equations (1.1) and (1.2) of the first current limit presentation control processing, s is a differential operator, K2 is a coefficient of the proportional term, and D2 is a coefficient of the differential term. The coefficient K2 may be a constant value or may be variably set according to the second current limit presentation command value Iadd2. For example, when the absolute value |Iadd2| of the second current limit presentation command value is small, the coefficient K2 may be set to substantially 0.

By S23, the second current limit presentation controller 47 increases the absolute value |Iadd2| of the second current limit presentation command value when the turning device 80 is in the output-limited state. Specifically, when the turning device 80 is in the output-limited state, the second current limit presentation controller 47 causes the absolute value |Iadd2| of the second current limit presentation command value to be larger as the absolute value |Δθr−t| of the angle difference is larger.

After S23, the process may proceed to S26 as it is, or S24 and S25 indicated by broken lines may be executed. In S24, it is determined whether the absolute value |Iadd2| of the second current limit presenting command value is smaller than the absolute value |Tst| of the target value input to the steering wheel torque controller 620. In the case of NO in S24, the current limit presentation command value Iadd2 is set to 0 in S25. S26 to S28 are substantially the same as S16 to S18** of the first current limit presentation control processing.

The angle difference Δθr−t used to calculate the first current limit presentation command value Iadd1 and the second current limit presentation command value Iadd2 may be a value filtered by an LPF or the like. A time constant or a filter characteristic of the LPF may be changed depending on whether the absolute values |Iadd1| and |Iadd2| of the current limit presentation command value are increased or decreased.

Figure 11:
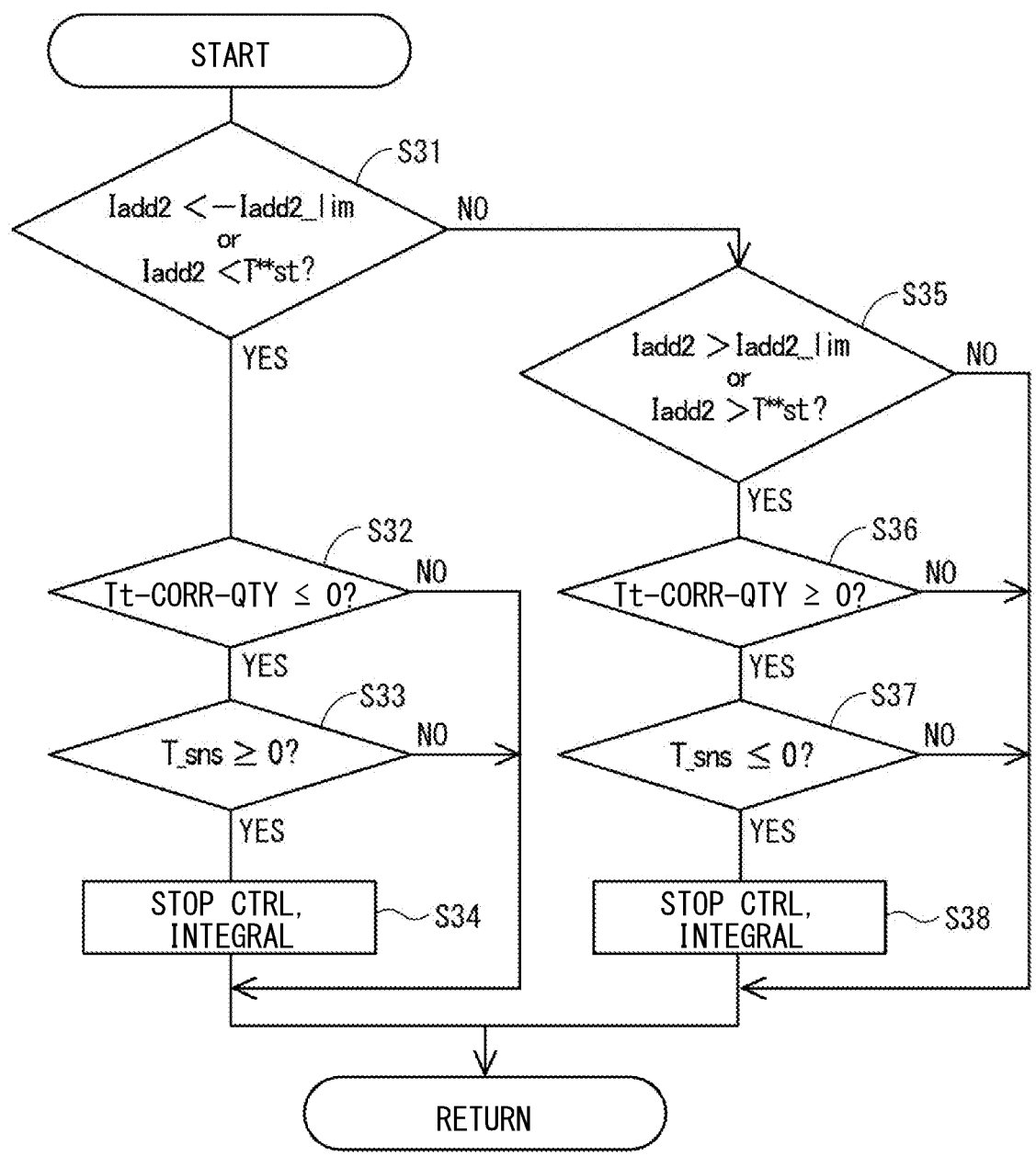
FIG. 11 is a flowchart illustrating control stop determination processing.

FIG. 11 illustrates the control stop determination processing by the control stop determiner 48. In S31, it is determined whether the negative second current limit presentation command value Iadd2 is smaller than a negative predetermined value (−Iadd2_lim). The negative predetermined value is set to a value of substantially 0, which is larger than an offset variation of the torque sensor 94. Alternatively, the negative predetermined value may be set to a lower limit value of the torque sensor 94. In S31, alternatively, it may be determined whether the negative second current limit presentation command value Iadd2 is smaller than the negative target value Tst input to the steering wheel torque controller 620. In other words, it may be determined whether the absolute value |Iadd2| of the second current limit presentation command value is larger than the absolute value |Tst| of the target value. In the case of YES in S31, this corresponds to a state in which the steering wheel 91 is turned to the right.

When the turning torque corresponding quantity is 0 or less and the detected value T_sns of the torque sensor 94 is 0 or more, the determinations in S32 and S33 result in YES, and the process proceeds to S34. In S34, the control stop determiner 48 stops the control of the steering wheel torque controller 620, specifically, stops the integral. In the case of NO in S32 or S33, the control is continued.

In the case of NO in S31, it is determined in S35 whether the second current limit presentation command value Iadd2 is larger than the positive predetermined value Iadd2_lim. The positive predetermined value is set to a value of approximately 0, which is larger than the offset variation of the torque sensor 94. Alternatively, the positive predetermined value may be set to the upper limit value of the torque sensor 94. In S35, alternatively, it may be determined whether the positive second current limit presentation command value Iadd2 is larger than the positive target value T**st input to the steering wheel torque controller 620. In the case of YES in S35, this corresponds to the state in which the steering wheel 91 is turned to the left. In the case of NO in S35, the steering wheel state is a retained or intermediate state, and the process is ended.

When the turning torque corresponding quantity is 0 or more and the detected value T_sns of the torque sensor 94 is 0 or less, the determinations in S36 and S37 result in YES, and the process proceeds to S38. In S38, the control stop determiner 48 stops the control of the steering wheel torque controller 620, specifically, stops the integral. In the case of NO in S36 or S37, the control is continued.

Figure 12A:
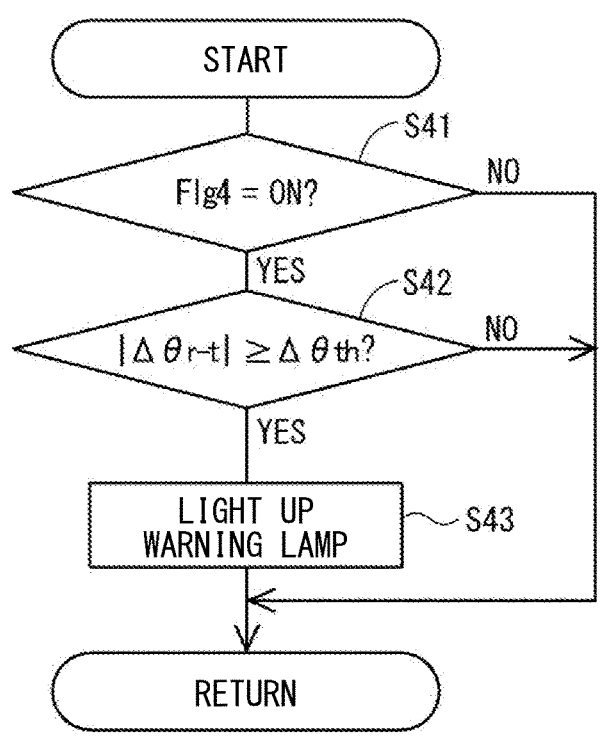
FIG. 12A is a flowchart illustrating processing for ON of Flg4.
Figure 13:
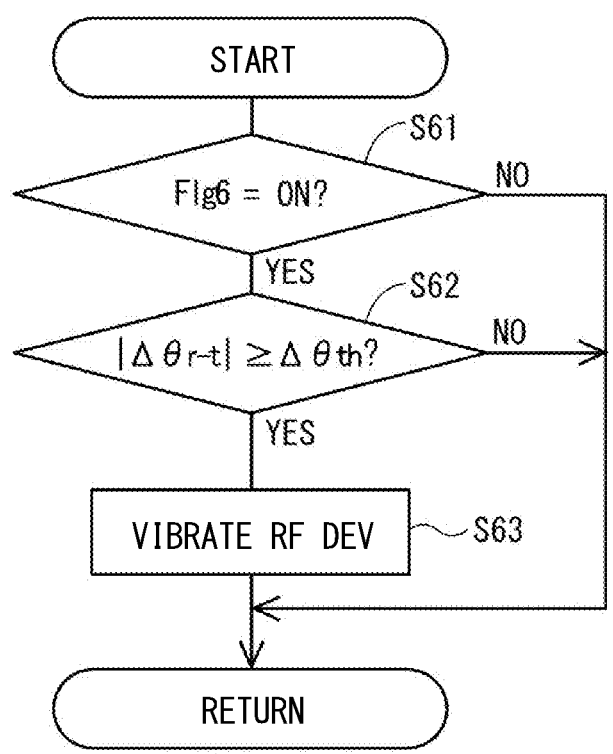
FIG. 13 is a flowchart illustrating processing for ON of Flg6.

FIGS. 12A and 13 illustrate the turning device current limit determination processing regarding the fourth flag Flg4 to the sixth flag Flg6. Now, the flowchart of FIG. 12A will be described. When it is determined in S41 that the fourth flag Flg4 is ON and it is determined in S42 that the absolute value |Δθr–t| of the angle difference is equal to or greater than the angle difference threshold Δθth, the process proceeds to S43. In S43, the turning device current limit determiner 45 issues a command to cause a meter to turn on a warning lamp.

Figure 12B:
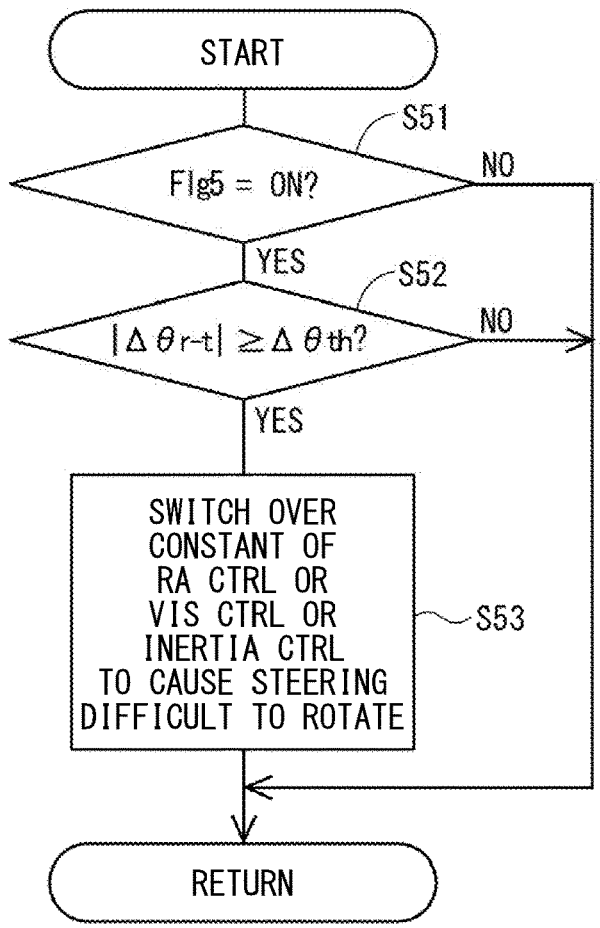
FIG. 12B is a flowchart illustrating processing for ON of Flg5.

Now, the flowchart of FIG. 12B will be described. When it is determined in S51 that the fifth flag Flg5 is ON and it is determined in S52 that the absolute value |Δθr–t| of the angle difference is equal to or greater than the angle difference threshold Δθth, the process proceeds to S53. In S53, the turning device current limit determiner 45 commands the reaction force controller 510, the viscosity controller 520, or the inertia controller 530 to switch over a constant of one or more of the corresponding reaction force control, viscosity control, and inertia control into a value that causes the steering wheel to be more difficult to rotate.

Now, the flowchart of FIG. 13 will be described. When it is determined in S61 that the sixth flag Flg6 is ON and it is determined in S62 that the absolute value |Δθr–t| of the angle difference is equal to or greater than the angle difference threshold Δθth, the process proceeds to S63. In S63, the turning device current limit determiner 45 commands a vibration actuator (not illustrated) to vibrate the reaction force device 70.

Figure 15A:
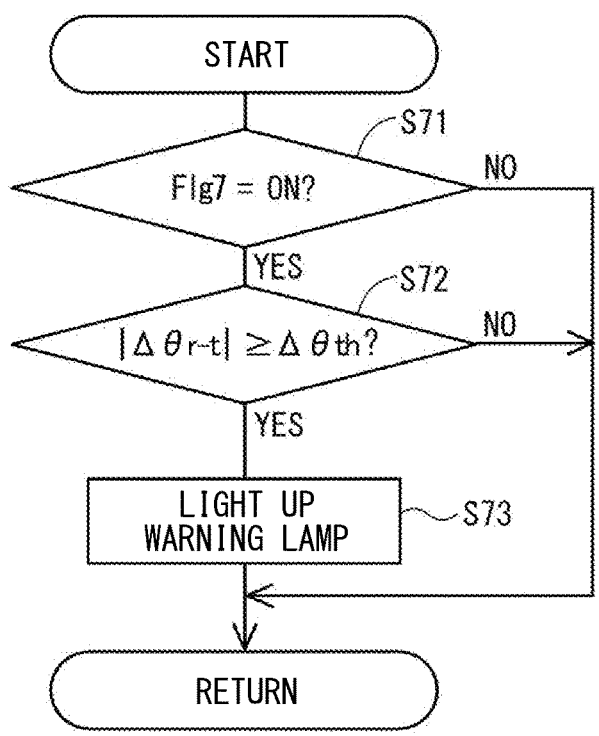
FIG. 15A is a flowchart illustrating processing for ON of Flg7.
Figure 15B:
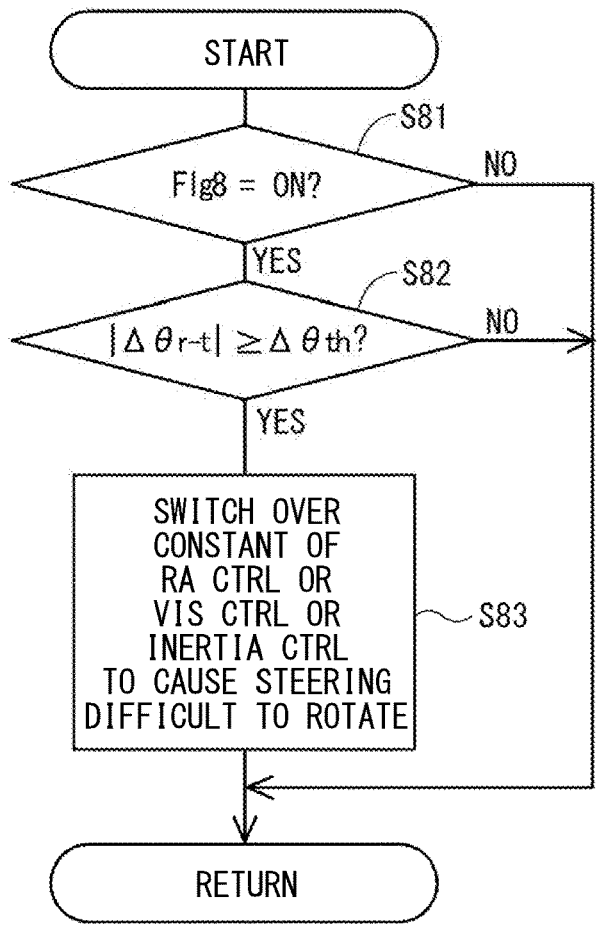
FIG. 15B is a flowchart illustrating processing for ON of Flg8.
Figure 16:
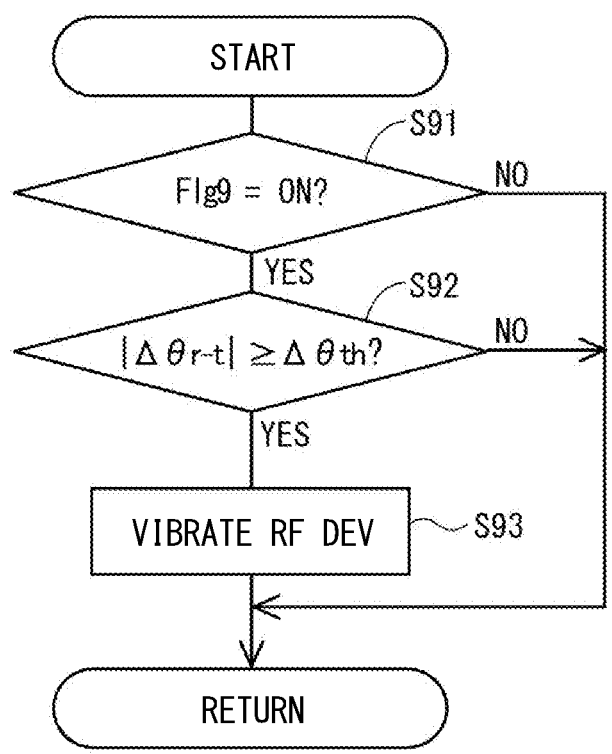
FIG. 16 is a flowchart illustrating processing for ON of Flg9.

Next, with reference to FIGS. 14 to 16, the reaction force device current limit determination processing by the reaction force device current limit determiner 65 will be described. The reaction force device current limit determination processing of FIGS. 14 to 16 corresponds to the turning device current limit determination processing of FIGS. 8, 12, and 13, and these are similar processing.

Figure 14:
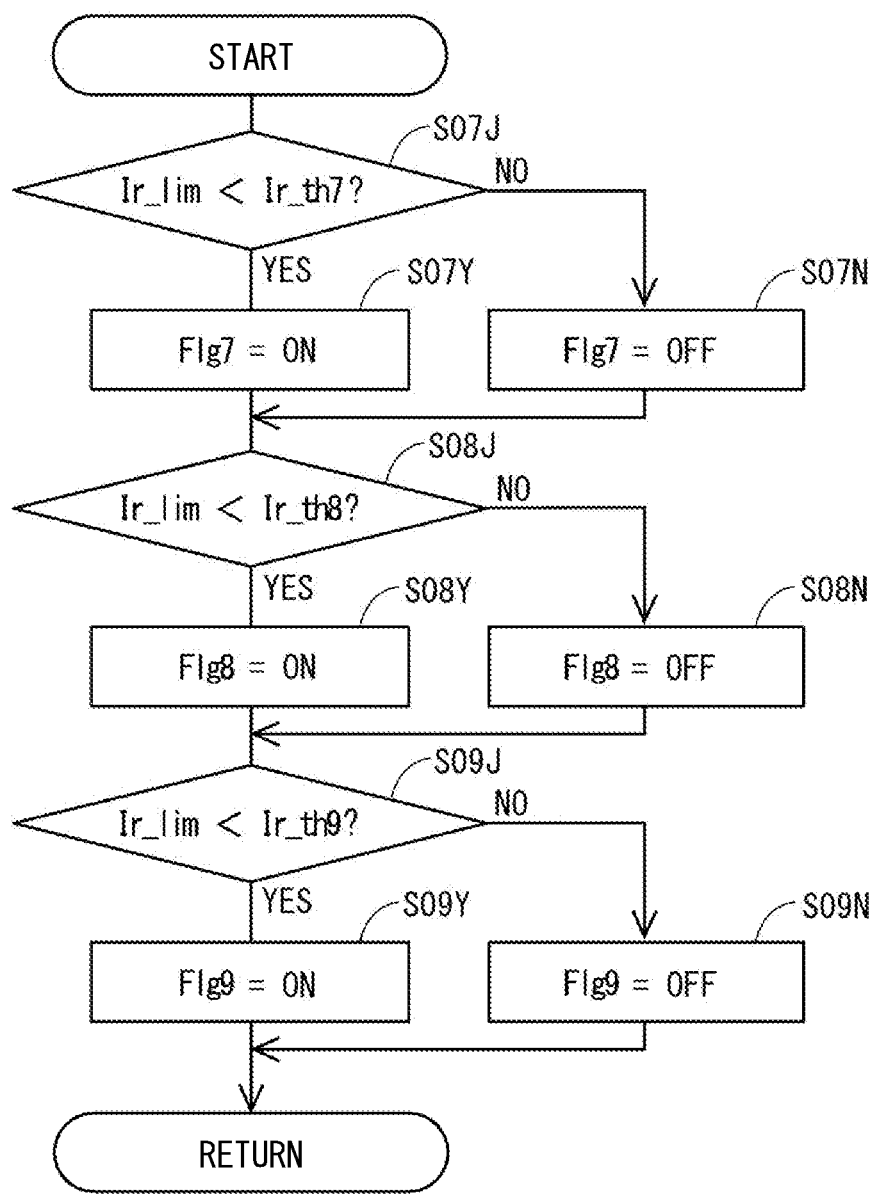
FIG. 14 is a flowchart illustrating Flg ON/OFF switchover processes in reaction force device current limit determination processing.

FIG. 14 illustrates ON/OFF switchover process on the seventh flag Flg7 to the ninth flag Flg9. In S07J, it is determined whether the reaction force device current limit value Ir_lim is smaller than a seventh current threshold Ir_th7. In the case of YES in S07J, the seventh flag Flg7 is set to ON in S07Y. In the case of NO in S07J, the seventh flag Flg7 is set to OFF in S07N. Similar processing is executed for the eighth flag Flg8 and the ninth flag Flg9. Specifically, it is determined whether the reaction force device current limit value Ir_lim is smaller than an n-th current threshold Ir_thn. In the case of YES in this determination, the n-th flag Flgn is set to ON, and in the case of NO, the n-th flag Flgn is set to OFF. Step numbers S08J to S09N in FIG. 14 are omitted in this description. The seventh current threshold Ir_th7 to the ninth current threshold Ir_th9 may be set independently, and there may be no restriction on magnitude relationships. When each of the flags Flg7 to Flg9 is ON, this indicates that the reaction force device 70 is in the output-limited state.

Now, the flowchart of FIG. 15A will be described. When it is determined in S71 that the seventh flag Flg7 is ON and it is determined in S72 that the absolute value |Δθr–t| of the angle difference is equal to or greater than the angle difference threshold Δθth, the process proceeds to S73. In S73, the reaction force device current limit determiner 65 commands the meter to turn on the warning lamp.

Now, the flowchart of FIG. 15B will be described. When it is determined in S81 that the eighth flag Flg8 is ON and it is determined in S82 that the absolute value |Δθr–t| of the angle difference is equal to or greater than the angle difference threshold Δθth, the process proceeds to S83. In S83, the reaction force device current limit determiner 65 commands the reaction force controller 510, the viscosity controller 520, or the inertia controller 530 to switch over a constant of at least one of the corresponding reaction force control, viscosity control, and inertia control into a value that causes the steering wheel to be more difficult to rotate than the before the switch over than before the switch over.

Now, the flowchart of FIG. 16 will be described. When it is determined in S91 that the ninth flag Flg9 is ON and it is determined in S92 that the absolute value |Δθr–t| of the angle difference is equal to or greater than the angle difference threshold Δθth, the process proceeds to S93. In S93, the reaction force device current limit determiner 65 commands a vibration calculator or a vibration actuator (not illustrated) of the reaction force device to vibrate the reaction force device 70.

Operational Effect of One Embodiment (1) In the steering control device 200 of the present embodiment, when the current flowing to the turning-use electric rotary machine 88 is limited due to overheating or power limiting in the turning device 80, the current limit presentation controller 46, 47 calculates the current limit presentation command value Iadd1, Iadd2. By reflecting the current limit presentation command value Iadd1, Iadd2 on the reaction force torque command value T*r, it is possible to cause the driver to recognize that the turning device 80 is in the output-limited state.

(2) When the turning device 80 is in the output-limited state, the current limit presentation controller 46, 47 causes the absolute value |Iadd1|, |Iadd2| of the current limit presentation command value to be larger as the absolute value |θθr−t| of the difference between the angle θr of the reaction force device and the angle θt of the turning device is larger. As a result, as a degree of non-performance of the rotation operation due to the output limitation of the turning device 80 is larger, it is possible to present the output-limited state to the driver in a stronger manner.

(3) In the present embodiment, the two current limit presentation controllers 46 and 47, respectively, use two kinds of value, which are the first current limit presentation command value Iadd1 added to the command value of the torque servo control and the second current limit presentation command value Iadd2 added to the output of the torque servo control. Because an upper limit of the first current limit presentation command value Iadd1 is the detection value T_sns of the torque sensor 94, the first current limit presentation command value cannot set high torques but can finely adjust the torque in a small torque region where the driver's sensitivity is high. The second current limit presentation command value Iadd2 can provide the reaction force pf a large torque to which the driver's sensitivity is low. The use of these two kinds of current limit presentation command values Iadd1 and Iadd2 makes it possible to present an appropriate reaction force in a wide torque range.

(4) When the absolute value |Iadd2| of the second current limit presentation command value is larger than the predetermined value or larger than the absolute value |Tst| of the target value input to the steering wheel torque controller 620, the control stop determiner 48 stops the control (specifically, integral) of the steering wheel torque controller 620. Accordingly, it is possible to avoid a state in which the effect of the second current limit presentation command value Iadd2 is canceled by the steering wheel torque controller 620**.

(5) When the turning device 80 becomes out of the output-limited state while it is determined that the angle θr of the reaction force device is near the end, the first current limit presentation controller 46 or the second current limit presentation controller 47 continues the calculation of the first current limit presentation command value Iadd1 or the second current limit presentation command value Iadd2 until the angle θr of the reaction force device is far from the end. As described above, because the present embodiment combines the determination as to the angle near the end and the presentation of the current limiting, it is possible to appropriately perform reaction force presentation to the driver.

(6) In the present embodiment, when the fourth flag Flg4 is ON and the absolute value |Δθr−t| of the angle difference is equal to or greater than the threshold Δθth, the turning device 80 turns on the warning lamp of the meter, which enables the driver to recognize that the turning device 80 is in the output-limited state.

(7) In the present embodiment, when the fifth flag Flg5 is ON and the absolute value |Δθr−t| of the angle difference is equal to or greater than the threshold Δθth, the characteristic of the reaction force control, the viscosity control or the inertia control is switched over to a characteristic that causes the driver to be more difficult to rotate the steering wheel. Accordingly, the driver can recognize that the turning device 80 is in the output-limited state.

(8) When the sixth flag Flg6 is ON and the absolute value |Δθr−t| of the angle difference is equal to or greater than the threshold Δθth, the present embodiment vibrates the turning device 80, which enables the driver to recognize that the turning device 80 is in the output-limited state.

(9) The reaction force device current limit determiner 65 determines that the reaction force device 70 is in the output-limited state, and switches the seventh flag Flg7 to the ninth flag Flg9 between ON and OFF. As is the case of the output-limited state of the turning device 80, the use of the seventh flag Flg7 to the ninth flag Flg9 makes it possible to convey to the driver that the reaction force device 70 is in the output-limited state.

(10) As illustrated in FIG. 2, in the present embodiment, the reaction force device 70 and the turning device 80 are redundantly configured with the two systems, so that even if one system fails, another normal system can continue driving. This improves reliability.

<Comparison with JP 2005-96725A>

The paragraph [0203] of JP 2005-96725A discloses that, in a vehicle steering control device of a steer-by-wire system, "a controller for a steering reaction force device lights up a lamp to issue a warning to a driver when both motors of a steering reaction force-use actuator and a turning-use actuator are overheated, Turning on a lamp to issue a warning to the driver" and "the steering reaction force-use controller and the turning device-use controller perform current value reduction control after the warning". There is at least the following difference between the present embodiment and the technology disclosed in JP 2005-96725A.

According to S24, S31, and S38 of FIG. 8 of JP 2005-96725A, a vehicular steering control device determines the hitting to an obstacle such as a curb and changes the reaction force when a steered angle difference is a predetermined value or more and a turning-use motor current is a predetermined value or more. When a current limit value falls below a predetermined value, this technology cannot determine the hitting to an obstacle such as a curb. By contrast, when the current of the turning device 80 is limited, the present embodiment presents the reaction force according to the difference between the angle of the reaction force device and the angle of the turning device, and therefore can present the reaction force only in cases where the steered angle does not follow due to an influence of the current limitation.

According to S70, S78, and S81 in FIG. 13 of JP 2005-96725A, when the motor temperature is high, the control is executed to gradually change the gain to implement the approach to the target value. This technology increases the reaction force until the target value is reached, and therefore, there is a concern that the reaction force is too large. By contrast, when the current of the turning device 80 is limited, the present embodiment presents the reaction force according to the difference between the angle of the reaction force device and the angle of the turning device, and therefore can control the absolute value of the angle difference to be as small as possible within a range of the current limit.

Other Embodiments (A) In the steer-by-wire system 90, the reaction force device 70 or the turning device 80 may not include the reaction-force-use reducer 79 or the turning-use reducer 89 illustrated in FIG. 1.

(B) The steering control device 200 is not limited to the electric-mechanical integrated type configuration as illustrated in FIG. 1. The controllers 270 and 280 and the power converters 77 and 87 may be arranged separately from the rotary electric machines 78 and 88. In this case, the two controllers 270 and 280 may not be physically separated but may be configured as a single body steering control device 200. Alternatively, one of the reaction force device 70 and the turning device 80 may be configured as a machine-electric integrated type including a managerial controller, and may transmit and receive signals to and from another device.

(C) The inertial controller 530 may not be provided in the reaction force device controller 270 of the steering control device 200, and the inertial command value Tinert may not be added to the steering torque command value T*st. In this, the switchover of the characteristic by using the fifth flag Flg5 and the eighth flag Flg8 may be excluded from the inertial control.

(D) "The physical quantity corresponding to X" used in the calculation of a respectively quantity in the present embodiment includes, in addition to the physical quantity X illustrated, various physical quantities that are uniquely convertible into X by multiplication and/or division of coefficients and/or differentiation and/or integral. For example, the physical quantity corresponding to "the rotational angular velocity ωr (deg/s) of the reaction force device" includes a rotational speed (rpm) of the reaction-force-use rotary electric machine 78, rotational speeds of various parts connected to the output shaft of the reaction-force-use rotary electric machine 78 via the reducer 79 etc., and the like.

(E) In the example of FIG. 5, the first current limit presentation command value Iadd1 is added to the sign inversion value of the steering torque command value T*st output by the reaction force controller 510. In this regard, depending on the definition of the sign, the first current limit suggestion command value Iadd1 may be added to the steering torque command value itself. Also, the viscosity command value Tvisc and the inertia command value Tinert may not be added in the adders 552 and 553.

The present disclosure is not limited to the embodiments illustrated above, and can be implemented in various forms without departing from the spirit and scope of the present disclosure.

The controllers, control devices, and methods described in the present disclosure may be implemented by a special purpose computer created by configuring a memory and a processor programmed to execute one or more particular functions embodied in computer programs. Alternatively, the controllers, control devices, and methods described in the present disclosure may be implemented by a special purpose computer created by configuring a processor provided by one or more special purpose hardware logic circuits. Alternatively, the controllers, control devices, and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

What is claimed is:

1. A steering control device in a steer-by-wire system, the steer-by-wire system including:
a reaction force device that is connected to a steering wheel, and that includes a reaction-force-use rotary electric machine and a reaction-force-use power converter for driving the reaction-force-use rotary electric machine;
a turning device that includes a turning-use rotary electric machine and a turning-use power converter for driving the turning-use electric machine, and that turns tire wheels; and
a torque sensor that detects a steering input of a driver, the steering control device being configured to control the reaction force device and the turning device, the steering control device comprising:
an angle controller that performs control so that an angle of the turning device matches an angle of the reaction force device;
a turning device current limit determiner that determines that the turning device is in an output-limited state;
a current limit presentation controller that calculates a current limit presentation command value so as to convey to the driver that the turning device current limit determiner has determined that the turning device is in the output-limited state;
a reaction force controller that calculates a steering torque command value on a basis of a physical quantity corresponding to an output torque of the turning device;
a steering wheel torque controller that calculates a basic reaction force torque command value, which is a basic value of a reaction force torque command value so that a detection value of the torque sensor follows a target value that is based on the steering torque command value;
an end controller that calculates an end presentation command value to present to the driver that the angle of the reaction force device approaches or reaches an end being a rotation limit; and
a reaction force device current controller that controls a current flowing to the reaction-force-use rotary electric machine, on a basis of the basic reaction force torque command value and the end presentation command value,
wherein
the current limit presentation controller increases an absolute value of the current limit presentation command value when the turning device is in the output-limited state,
the steering wheel and the tire wheels are not mechanically connected,
the reaction force device and the turning device are communicably connected,
the reaction force device instructs the reaction-force-use power converter to generate torque to the steering wheel so as to apply reaction force in response to steering operation by the driver, and
the output-limited state corresponds to a state in which the current flowing to the reaction force-use rotary electric machine is limited.

2. The steering control device according to claim 1, wherein:
when the turning device is in the output-limited state, the current limit presentation controller causes the absolute value of the current limit presentation command value to be larger as an absolute value of a difference between the angle of the reaction force device and the angle of the turning device is larger.

3. The steering control device according to claim 1, further comprising:
a control stop determiner that determines to stop a control of the steering wheel torque controller, wherein:
the current limit presentation controller includes:
a first current limit presentation controller that calculates a first current limit command value to be added to the steering torque command value calculated by the reaction force controller or a sign inverted value of the steering torque command value; and
a second current limit presentation controller that calculates a second current limit presentation command value to be added to the basic reaction force torque command value calculated by the steering wheel torque controller; and
the control stop determiner stops the control of the steering wheel torque controller when an absolute value of the second current limit presentation command value is larger than a predetermined value.

4. The steering control device according to claim 3, wherein:
the control stop determiner stops the control of the steering wheel torque controller when the absolute value of the second current limit presentation command value is larger than an absolute value of the target value input to the steering wheel torque controller.

5. The steering control device according to claim 3, wherein:
even if the turning device becomes out of the output-limited state while it is determined that the angle of the reaction force device is near the end, the first current limit presentation controller or the second current limit presentation controller continues calculating the first current limit presentation command value or the second current limit presentation value until it is determined that the angle of the reaction force device is far from the end.

6. The steering control device according to claim 1, wherein:
when the turning device is in the output-limited state and an absolute value of a difference between the angle of the reaction force device and the angle of the turning device is equal to or greater than a predetermined angle difference threshold, the turning device current limit determiner issues a command to switch over a characteristic of at least one of a reaction force control and a viscosity control into a characteristic that causes the steering wheel to be more difficult to rotate,
wherein the reaction force control calculates a reaction force command value of the reaction force device on a basis of the physical quantity corresponding to the output torque of the turning device, and the viscosity control calculates a viscosity command value of the reaction force device on a basis of a physical quantity corresponding to a rotational angular velocity of the reaction force device.

7. The steering control device according to claim 1, wherein:
when the turning device is in the output-limited state and an absolute value of a difference between the angle of the reaction force device and the angle of the turning device is equal to or greater than a predetermined angle difference threshold, the turning device current limit determiner issues a command to vibrate the reaction force device.

8. The steering control device according to claim 1, further comprising:
a reaction force device current limit determiner that determines that the reaction force device is in an output-limited state,
wherein:
when the reaction force device is in the output-limited state and an absolute value of a difference between the angle of the reaction force device and the angle of the turning device is equal to or greater than a predetermined angle difference threshold, the reaction force device current limit determiner issues a command to switch over a characteristic of at least one of a reaction force control and a viscosity control into a characteristic that causes the steering wheel to be more difficult to rotate;
the reaction force control calculates a reaction force command value of the reaction force device on a basis of the physical quantity corresponding to the output torque of the turning device; and
the viscosity control calculates a viscosity command value of the reaction force device on a basis of a physical quantity corresponding to a rotational angular velocity of the reaction force device.

9. The steering control device according to claim 1, further comprising:
a reaction force device current limit determiner that determines that the reaction force device is in an output-limited state,
when the reaction force device is in the output-limited state and an absolute value of a difference between the angle of the reaction force device and the angle of the turning device is equal to or greater than a predetermined angle difference threshold, the reaction force device current limit determiner issues a command to vibrate the reaction force device.

10. The steering control device according to claim 1, wherein:
at least of one of the reaction force device and the turning device includes:
a rotary electric machine that includes windings of two systems and that serves as a corresponding one of the reaction-force-use rotary electric machine and the turning-use rotary electric machine; and
power converters of the two systems that energize the windings of the two systems, respectively, and that serve as a corresponding one of the reaction-force-use power converter and the turning-use power converter.

11. The steering control device according to claim 10, wherein:
when a total value of outputs of the power converters of the two systems is in a limited state, it is determined that the reaction force device or the turning device is in the output-limited state.

12. The steering control device according to claim 5, wherein:
when an absolute value of the angle of the reaction force device is equal to or larger than a limit angle, the first current limit presentation controller or the second current limit presentation controller determines that the angle of the reaction force device is near the end;
when the absolute value of the angle of the reaction force device is smaller than the limit angle, the first current limit presentation controller or the second current limit presentation controller determines that the angle of the reaction force device is far from the end; and
the limit angle is smaller than the end being the rotation limit of the reaction force device.

13. A steering control device in a steer-by-wire system, the steer-by-wire system including:

a reaction force device that is connected to a steering wheel, and that includes a reaction-force-use rotary electric machine and a reaction-force-use power converter for driving the reaction-force-use rotary electric machine;

a turning device that includes a turning-use rotary electric machine and a turning-use power converter for driving the turning-use electric machine, and that turns tire wheels; and a torque sensor that detects a steering input of a driver, the steering control device being configured to control the reaction force device and the turning device, the steering control device comprising a processor and a memory, the memory storing a program configured to, when executed by the processor, cause the processor to:

perform control so that an angle of the turning device matches an angle of the reaction force device;

determine that the turning device is in an output-limited state;

calculate a current limit presentation command value so as to convey to the driver that it is determined that the turning device is in the output-limited state;

calculate a steering torque command value on a basis of a physical quantity corresponding to an output torque of the turning device;

calculate a basic reaction force torque command value, which is a basic value of a reaction force torque command value so that a detection value of the torque sensor follows a target value that is based on the steering torque command value;

calculate an end presentation command value to present to the driver that the angle of the reaction force device approaches or reaches an end being a rotation limit;

control a current flowing to the reaction-force-use rotary electric machine, on a basis of the basic reaction force torque command value and the end presentation command value; and increase an absolute value of the current limit presentation command value when the turning device is in the output-limited state, wherein the steering wheel and the tire wheels are not mechanically connected, the reaction force device and the turning device are communicably connected, the reaction force device instructs the reaction-force-use power converter to generate torque to the steering wheel so as to apply reaction force in response to steering operation by the driver, and the output-limited state corresponds to a state in which the current flowing to the reaction force-use rotary electric machine is limited.

14. The steering control device according to claim 1, wherein:
the current limit presentation command value is combined with the basic reaction force torque command value; and
the reaction force device current controller controls the current flowing to the reaction-force-use rotary electric machine on the basis of the basic reaction force torque command value, which conveys to the driver that the turning device current limit determiner has determined that the turning device is in the output-limited state.

15. The steering control device according to claim 1, wherein:
the current limit presentation command value is combined with the basic reaction force torque command value, which changes a reaction force output to the steering wheel by the reaction-force-use rotary electric machine and conveys to the driver that the turning device current limit determiner has determined that the turning device is in the output-limited state.

16. The steering control device according to claim 1, wherein:
at least one of turning on a warning lamp in a meter, making the steering wheel heavier, and vibrating the steering wheel is executed so that the driver recognizes that the turning device is in the output-limited state.

17. The steering control device according to claim 1, wherein:
the angle controller calculates an angle difference between the angle of the turning device and a value obtained by multiplying the angle of the reaction force device by a predetermined angle ratio; and
when the turning device is in the output-limited state, the current limit presentation controller increases the absolute value of the current limit presentation command value as an absolute value of the angle difference is larger.

18. The steering control device according to claim 1, wherein:
during the output-limited state, the current flowing to the reaction force-use rotary electric machine is set to be lower than a predetermined value.

19. The steering control device according to claim 1, wherein:
the reaction force electric machine is rotationally connected to the steering wheel and not rotationally connected to the tire wheels; and
the turning electric machine is rotationally connected to the tire wheels and not rotationally connected to the steering wheel.

* * * * *